Figure 15:
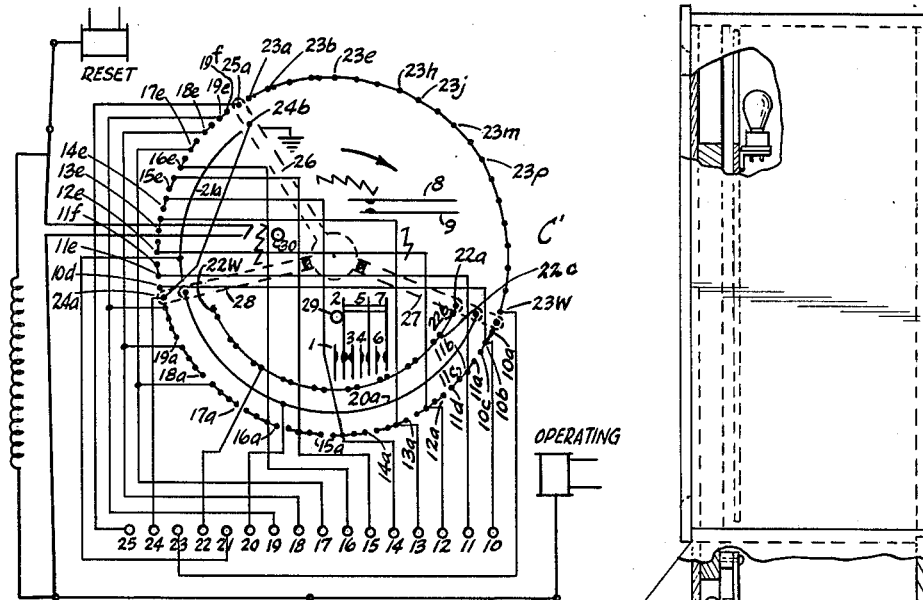

June 30, 1953  J. C. KOCI  2,643,884
MINIATURE BOWLING ALLEY
Filed June 3, 1950  12 Sheets-Sheet 1
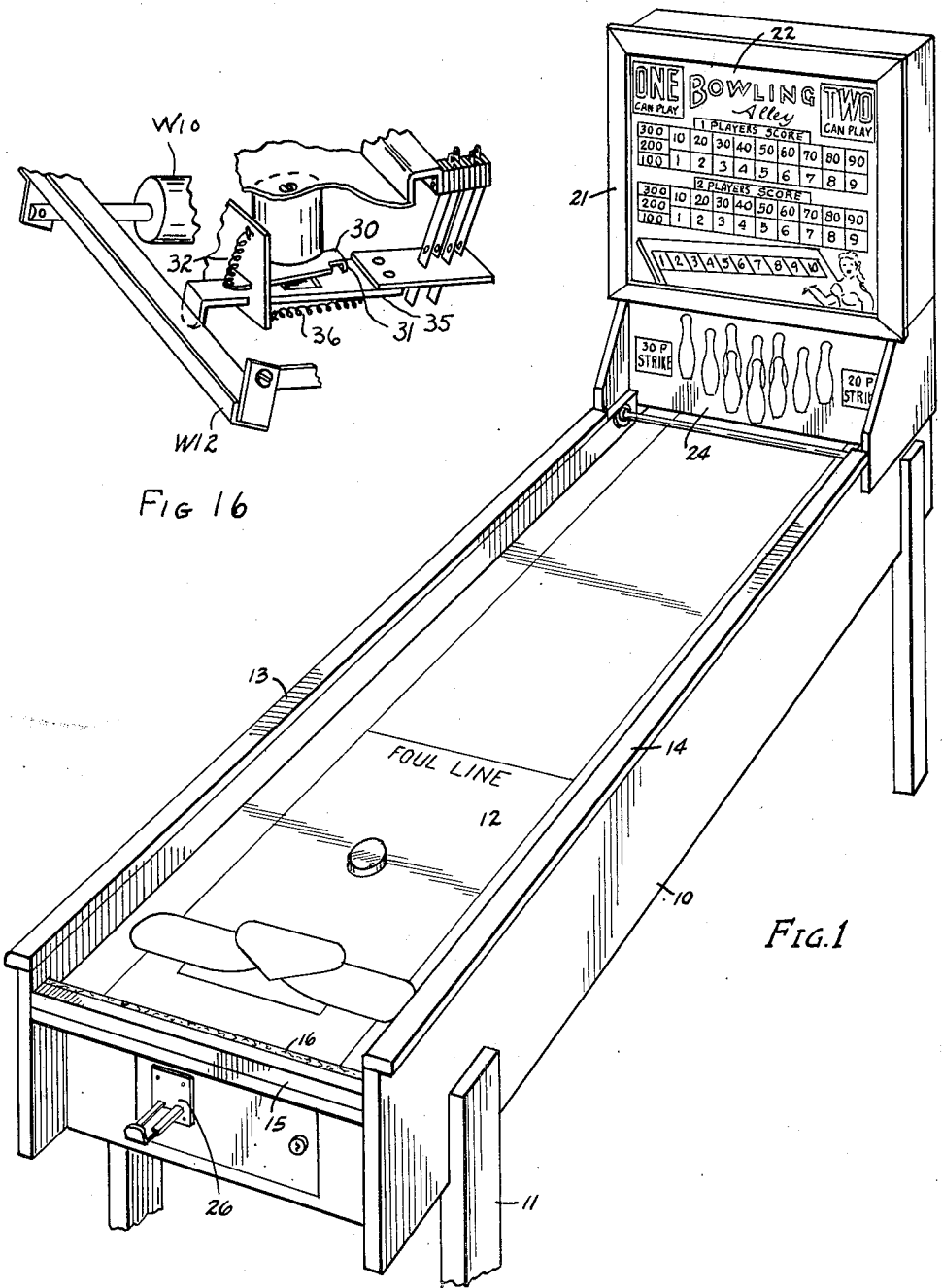
INVENTOR
JERRY C. KOCI
BY Robert L. Kahn
ATTORNEY June 30, 1953  J. C. KOCI  2,643,884
MINIATURE BOWLING ALLEY
Filed June 3, 1950  12 Sheets-Sheet 2

INVENTOR.
JERRY C. KOCI
BY
Robert L. Kahn
ATTORNEY.

June 30, 1953　　　　　J. C. KOCI　　　　　2,643,884
MINIATURE BOWLING ALLEY

Filed June 3, 1950　　　　　　　　　　　　　12 Sheets-Sheet 3

INVENTOR.
JERRY C. KOCI
BY Robert L. Kahn
ATTORNEY.

INVENTOR.
JERRY C. KOCI
BY Robert L. Kahn
ATTORNEY.

INVENTOR.
JERRY C. KOCI
BY
Robert L. Kahn
ATTORNEY.

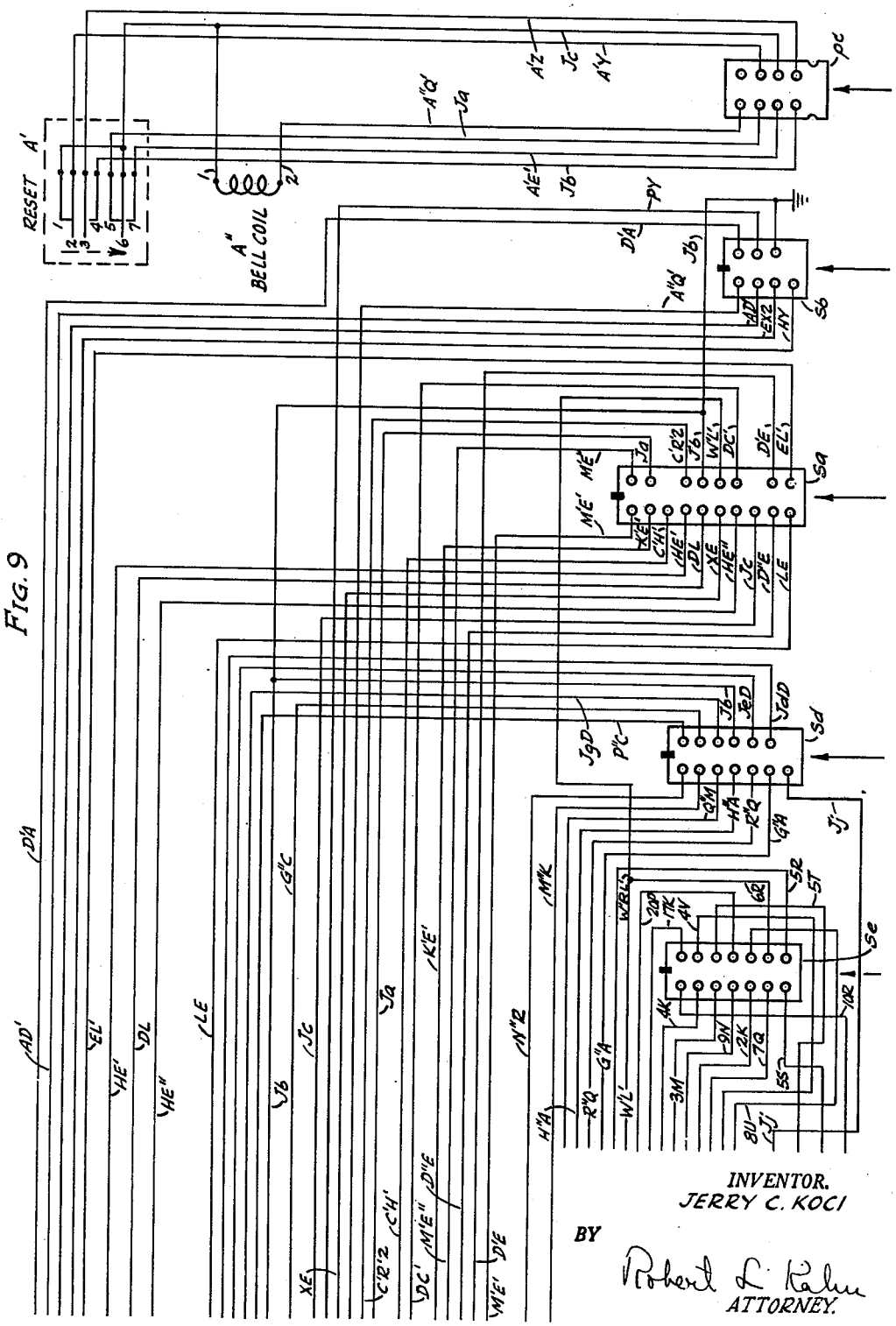

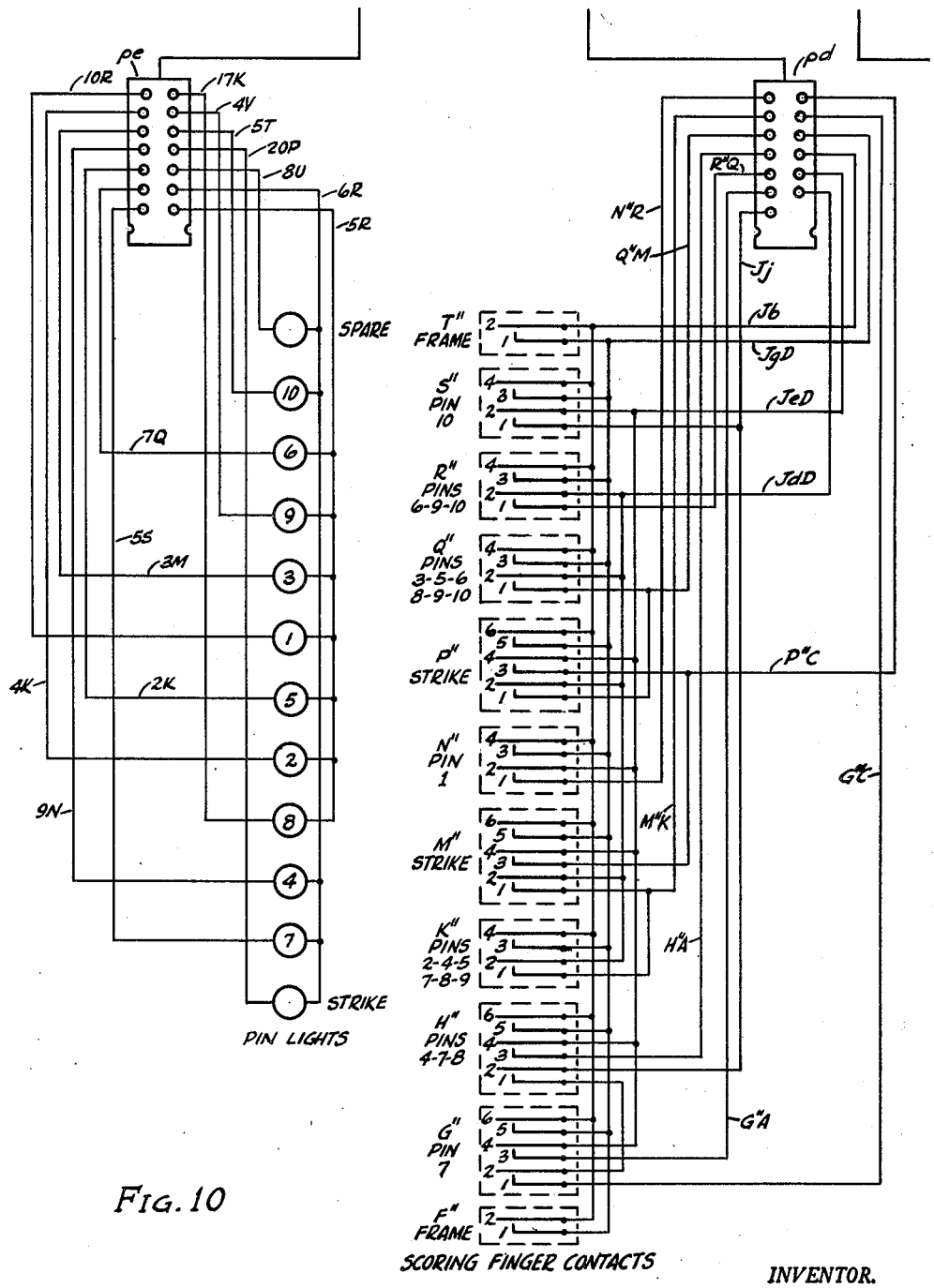

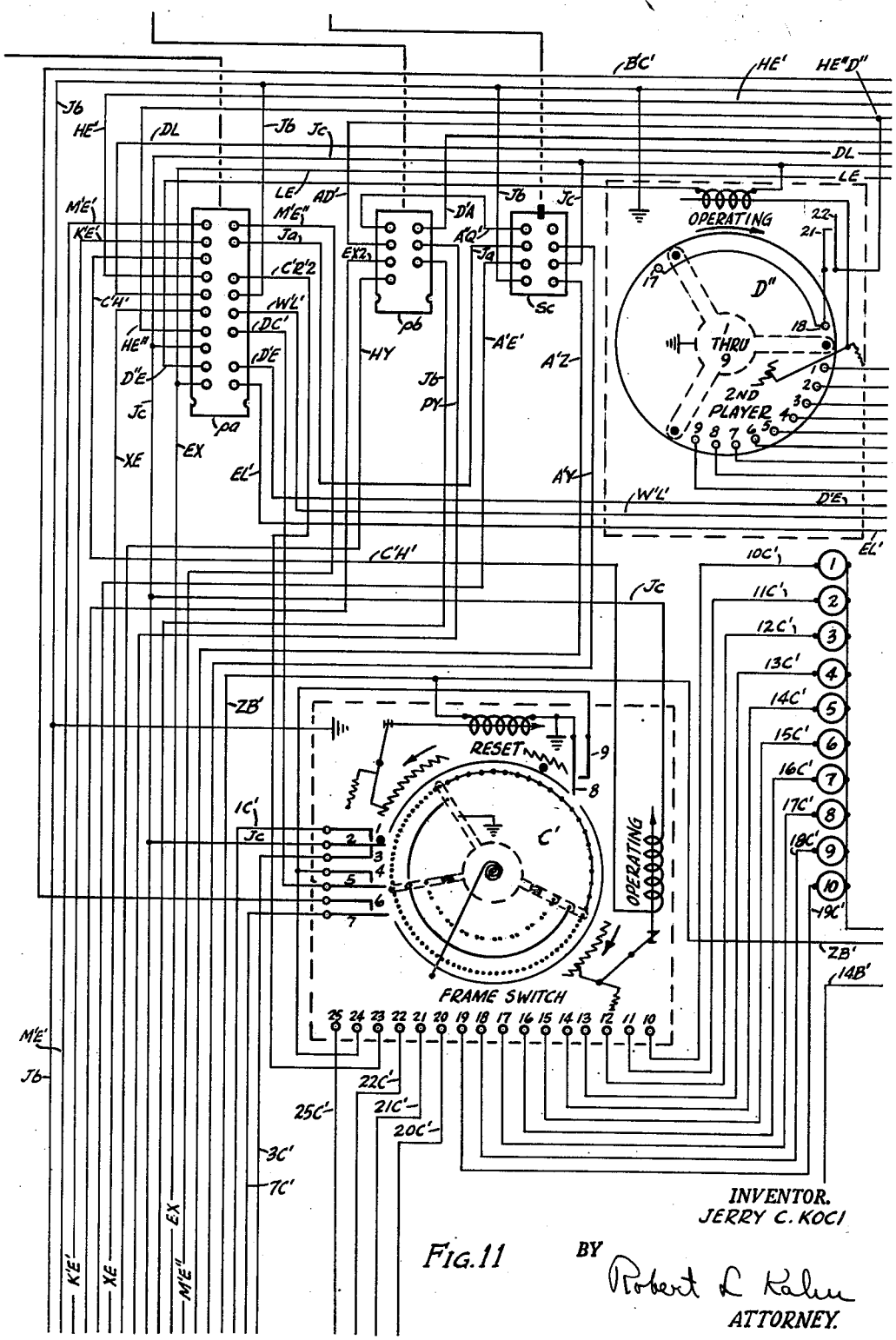

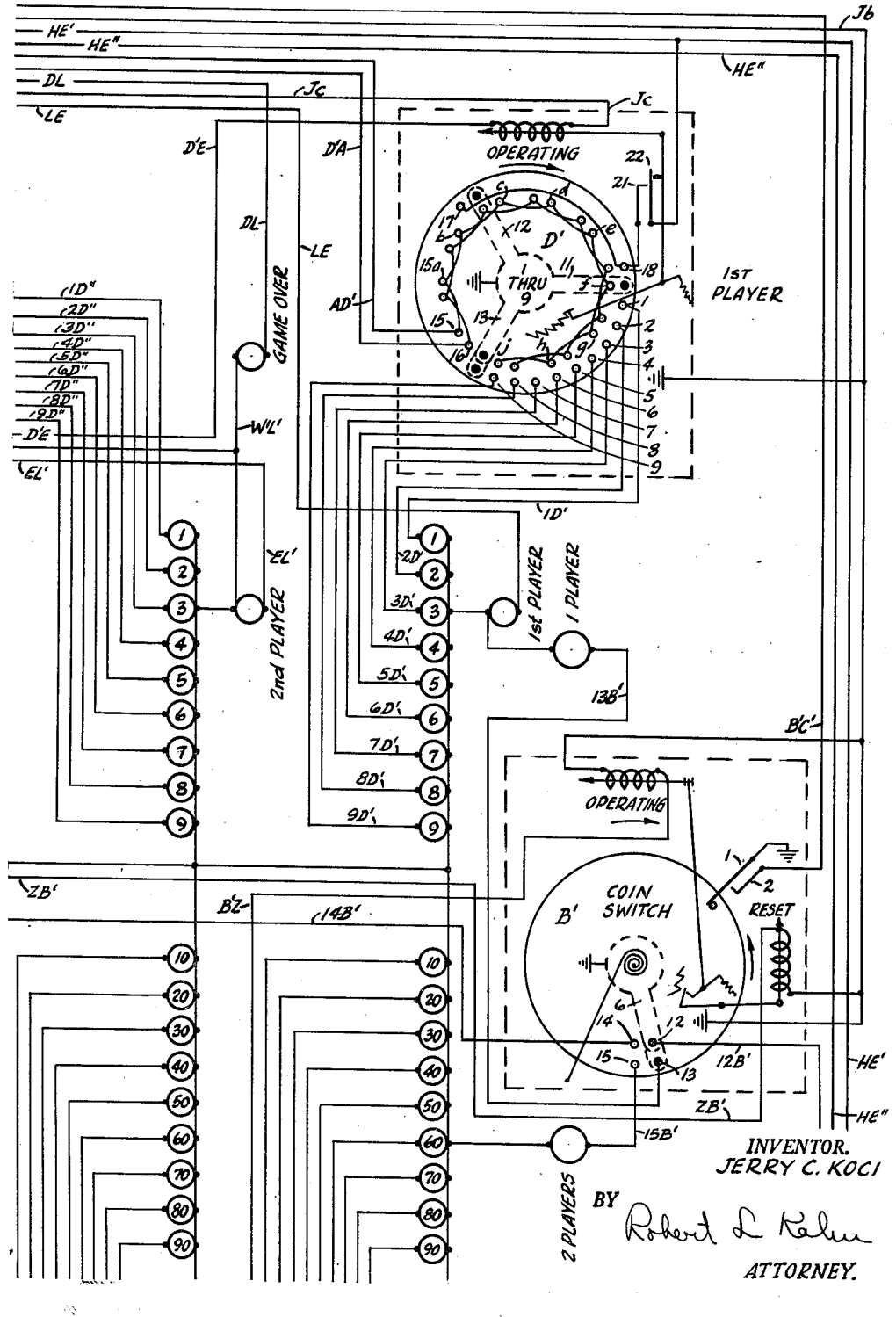

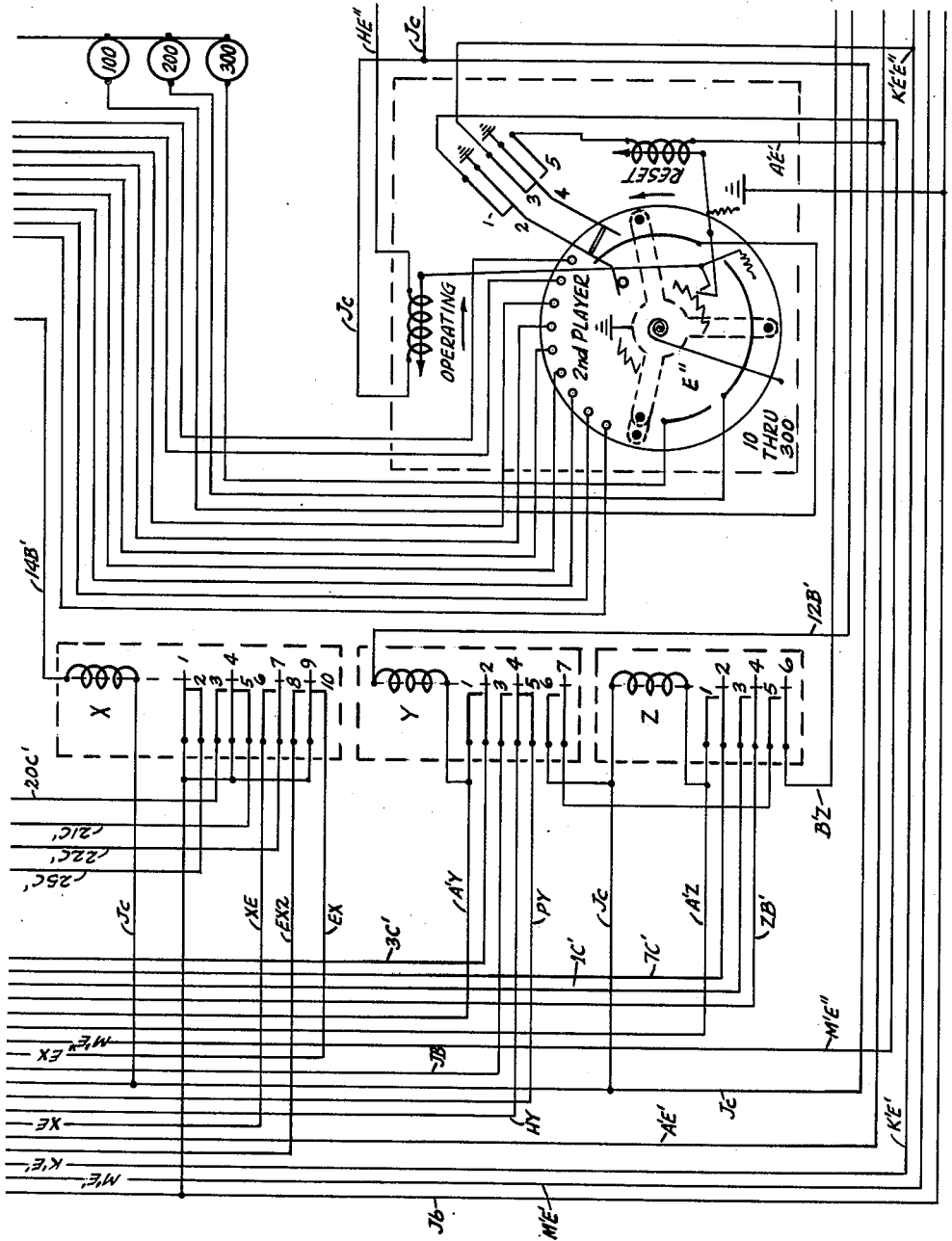

Patented June 30, 1953

2,643,884

UNITED STATES PATENT OFFICE 2,643,884

MINIATURE BOWLING ALLEY

Jerry C. Koci, Barrington, Ill., assignor to Chicago Coin Machine Co., Chicago, Ill., a corporation of Illinois Application June 3, 1950, Serial No. 166,000

14 Claims. (Cl. 273—41)

This invention relates to a game apparatus and particularly to a miniature bowling alley with electrical scoring means and electrical controls for determining the duration of a game. The invention hereinafter described makes it possible for one player to use the game or for two players to compete against each other. In accordance with the invention, electrically operated means are provided for indicating the number of frames for either solo or dual play and also for showing the score for either solo or dual play.

The invention, in general, provides a bowling alley which may be put into operative condition by coin controlled or other manually controlled switching means, such switching means being adapted to be operated so that the game may be used either for solo or dual play. The switching means energizes a suitable stepping switch which conditions circuits so that the system returns to a starting position with all scores set to zero and conditions these circuits so that solo or dual operation may be provided. The electrical scoring means handles the scoring in a manner generally resembling a conventional bowling alley.

The game apparatus specifically embodying the present invention shows ten pins arranged in the customary manner and has suitable electrical switching means positioned at appropriate places to be actuated by the game element, a puck or ball as the case may be. The arrangement of switches is such that when a puck or ball engages a certain switch corresponding to a certain pin, a number of pins will be effectively disabled. Thus for example, it is well known in a conventional bowling alley, that if the ball strikes somewhat to the left or right of number one pin that a strike may result. The same possibilities exist in the game, the switching means being so arranged that when the game element such as a puck or ball strikes the switch corresponding to a strike position, then the scoring may provide for a strike. Conversely, when other switches are energized, a certain number of pins will be disabled, this being analogous to the corresponding pins being knocked down in a conventional alley. Provisions for spares are made in scoring.

In a conventional alley, it is well known that the speed of the ball as well as such variables as the direction of spin of the ball and the side of the pin struck by the ball will determine to a degree the actual number of pins which may fall. Thus, in a conventional alley, some difference in scoring results on the same play. This effect is duplicated in the present game by suitable switching means giving some random variation in scoring. It is true that this random variation in scoring is not under the control of the player so that in effect, the player has no control over the scoring within some limits. However, this random variation in scoring makes a game more enjoyable and provides an element of competition and demands skill so that the enjoyment of the game is enhanced.

Scoring is accomplished by a number of stepping switches suitably arranged and controlled to accomplish a desired result.

Figure 2:
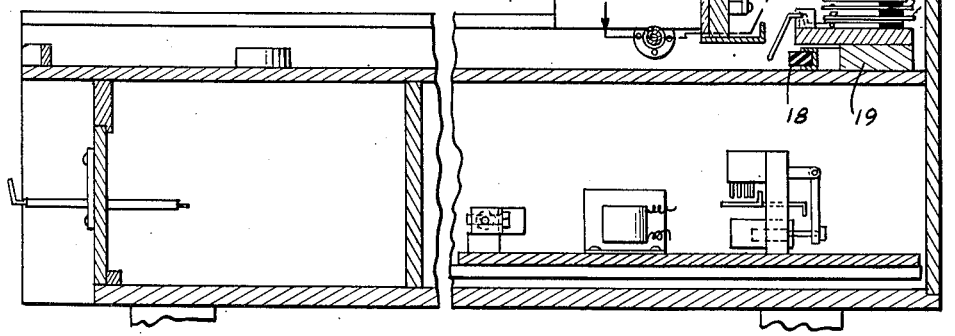
Figure 3:
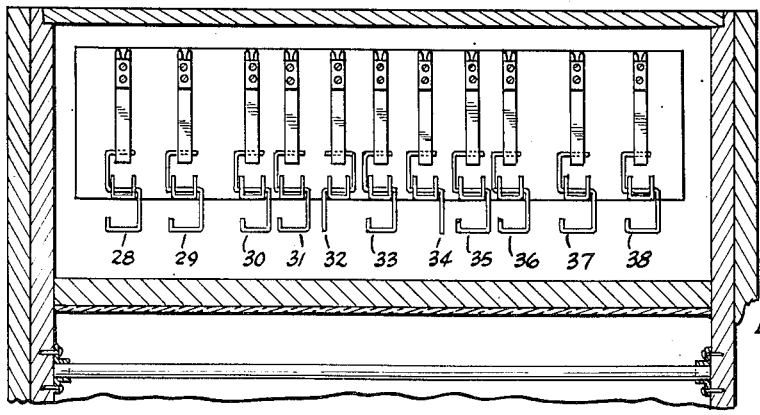
Figure 14:
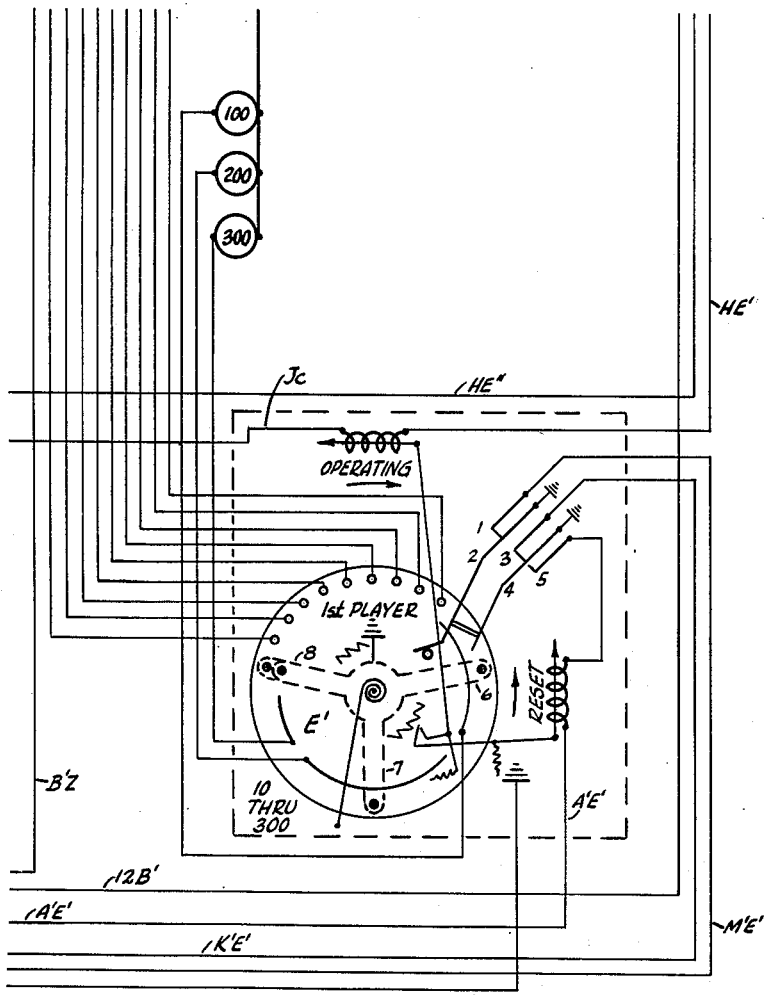
Figure 4:
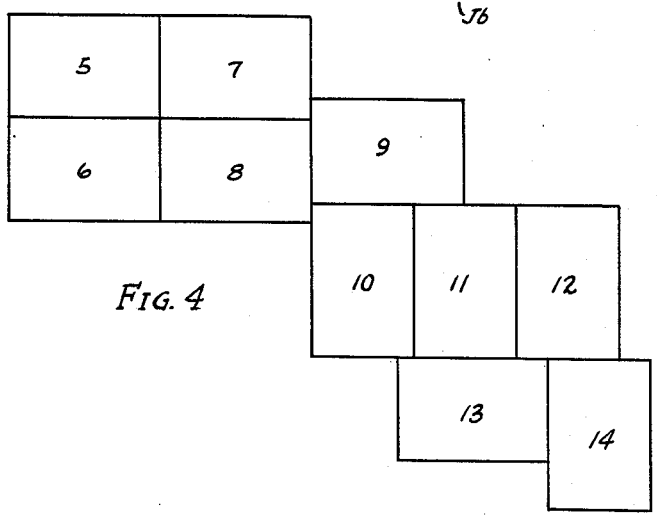

In order that the invention may be understood, it will now be explained in detail, particular reference being made to the drawings wherein Fig. 1 is a perspective view of a game embodying the present invention. Fig. 2 is a side elevation with certain parts removed showing the arrangement of various portions of the electrical system forming the subject matter of this invention. Fig. 3 is a transverse view of the arrangement of switching fingers to be engaged or actuated by a game element. Figure 4 is a diagram showing the arrangement of the remaining sheets of drawing making up a complete circuit layout of a system embodying the invention. Figs. 5 to 14 inclusive are parts of the circuit forming the subject matter of the present invention. Fig. 15 is a detail of the frame counting switch. Figure 16 illustrates a mechanical relay interlock.

Referring first to Figs. 1 to 3 inclusive, the game forming the subject matter of the present invention may be housed in a wooden cabinet 10 supported on legs 11 and having alley 12. The sides of the alley are bounded by walls 13 and 14. The front end of the alley is bounded by wall 15 having layer 16 of felt or rubber. The rear of the alley is bounded by abutment 18 of felt or rubber supported in a suitable manner from structure 19 extending the full width of the alley.

Disposed across the alley near the rear thereof is superstructure 21 having scoring panel 22 and target area 24. This target area shows a perspective view of ten pins arranged in the conventional triangle, number one pin being at the front apex and the remaining pins being numbered in the conventional fashion, namely, from left to right along successive rows. Thus pin number 1 is at the front apex and pin 7 is at the left apex of the entire triangle and pin 10 is at the right apex of the entire triangle formed by all the pins. Inasmuch as this arrangement in numbering the pins is conventional, a detailed showing and discussion thereof is deemed to be unnecessary.

Controlling the game is coin slide 26 associated with switch means A' shown in detail in the wiring system to be described later. Instead of coin slide 26, any other manual control may be provided for rendering the game system operative and selecting solo or dual play.

Supported on base 19 is a series of pivoted fingers 28 to 38 inclusive. With the exception of fingers 32 and 34, all the fingers are generally S-shaped and bent as shown in Fig. 2 so that one part of the finger extends downwardly in front of abutment 18 forming the rear end of the alley. Fingers 32 and 34 have simple extensions going down in front of alley wall 18 but otherwise are the same as the remaining fingers. Switch fingers 28 to 38 inclusive are disposed across the alley and positioned so that they are behind certain pins. End fingers 28 and 38 are not behind any pins at all and merely register a frame, this corresponding to a ball rolling down the side gutters in a conventional alley without touching any pins. Fingers 29 and 37 are behind pins 7 and 10 respectively. Fingers 30 and 36 are behind pins 4 and 6 respectively. Fingers 31 and 35 are behind pins 8 and 2 on one hand and 9 and 3 on the other hand respectively. Finger 33 is behind pins 1 and 5. Finger 32 is located behind a point to the left of pin 1 as seen from the front. Finger 34 is located in the corresponding position at a point behind pins 1 and 3 somewhat to the right of pin 1.

As previously indicated, a game element, such as a puck or ball, striking fingers 28 or 38 will only register a frame and will not register any score. Assuming all pins illuminated at the beginning of a frame, the following will occur. Fingers 29 and 37 respectively, will register pins 7 and 10 respectively in addition to functioning as a part of a frame scoring means. Finger 30 will register pins 4, 7 and 8 while finger 36 will register corresponding pins 6, 9 and 10. Finger 31 will register pins 2, 4, 5, 7, 8 and 9. Finger 35 will register pins 3, 5, 6, 8, 9 and 10. Finger 33 will register all but pin 10. Sometimes pins 4 and 7 only will be left or pins 4, 7 and 10, depending upon the position of the stepping switches. Finger 32 alone will register 2, 4, 5, 7, 8, 9 and finger 34 alone will register 3, 5, 6, 8, 9 and 10. Due to the size of the puck and fingers, these will hardly ever operate alone. Fingers 31 and 32 together will register a strike. The same is true of fingers 34 and 35. As a rule, the puck or ball is large enough so that it will generally strike several adjacent switch fingers. Thus for example, finger 33 will generally be tripped together with finger 32 or 34.

Some variation from the above scoring on the first puck will arise because of one scoring switch having a random effect. The second puck will catch the remaining pins in the groups controlled by the fingers.

Each switch finger cooperates with switches to be described hereafter and indicated by capital letters with a double prime. Thus for example, finger 28 cooperates with switch F″ while finger 38 cooperates with switch T″. The remaining fingers 29 to 37 inclusive cooperate respectively with switches G″, H″, K″, M″, N″, P″, Q″, R″ and S″.

The scoring is indicated in the scoring panel by illuminated indications, the lamps being controlled by the electrical system to be hereinafter described. The gong or other announcing means may be provided to indicate a strike, the winding for the gong being shown as A″ and being suitably wired in the system to be energized upon the occurrence of a strike.

First a general description of the system will be given without reference to the detailed wiring, this being given later. Relays A to H inclusive (Figs. 5 and 7) and X, Y and Z (Fig. 13) are provided, these relays being conventional relays. Each relay has an actuating winding with contacts suitably operated by an armature so that some contacts which are normally open are closed and other contacts which are normally closed are open.

Relays K, M, N and P to V inclusive (Figs. 6 and 8) are also more or less conventional relays each having individual operating windings. However, these relays are mechanically interlocked with relay W so that the contacts of this group of relays may be released when winding W is energized. It is understood, of course, that if any of the relays of this interlocked group have not been operated, the releasing action of winding W will be idle. All relays are shown in a normal position.

Figure 16 illustrates a simple construction for interlocking relays referred to above. Thus armature W10 is tied to cross bar W12. Each relay in the interlocked group, as V for example, has armature 30 provided with locking tip 31. Spring 32 normally biases armature 30 away from the winding so that 31 may lock against slide 35 and retain 35 in locked position against the pull of spring 36. The movable contacts are engaged by slide bar 35. When the armature is pulled up slide 35 moves to the position shown. When W is energized, cross bar W12 pushes slide 35 back to a locked position.

There are six stepping switches. Thus stepping switch B′ (Fig. 12) has two positions—solo play and dual play, respectively. This stepping switch is controlled by a player depositing a coin which releases switches A′ for operation by a player. For convenience, switches A′ will be referred to as coin controlled. When coin controlled switches A′ are operated once, stepping switch B′ remains in or goes to solo position and if A′ is operated twice, stepping switch B′ will advance to the dual position. Stepping switch B′ has its position determined by the number of coins used in connection with switches A′ (and the number of manual operations of the switches). For convenience, stepping switch B′ is shown in the drawings and at times referred to as a coin switch. At the end of a game, stepping switch B′ is dead. This stepping switch has a conventional operating coil for advancing the wiper and a reset coil for restoring the switch to an off position.

Stepping switch C′ (Fig. 11) is provided for showing the number of frames played. This stepping switch has a number of contacts together with operating and reset windings and is adapted to control lights 1 to 10 inclusive for indicating the number of frames played. Figure 15 shows the internal wiring of this switch.

Stepping switch D′ (Fig. 12) has three series of contacts cooperating with wipers. This stepping switch has one operating winding for advancing the switch. In addition, the stepping switch is open in a home position but closed in other positions of the switch. Stepping switch D″ (Fig. 11) is simpler than D′, these two stepping switches being used for scoring from 1 to 9 inclusive for each player. It is understood that in the event that only one person plays, then only one stepping switch, D′, will be operative. These two stepping switches are adapted to control score indicating lights marked from 1 to 9 inclusive. Switch D′ can give two different scores for the same energizing impulses so that random score differences are possible with the same pin switches.

Stepping switches E' (Fig. 14) and E'' (Fig. 13) are similar to each other and are arranged to indicate the score for each player in multiples of 10 up to 100 and then in the hundreds. These two stepping switches have contacts which have one position when the switch is in the home position and another position when the stepping switch is moved from the home position. The stepping switches are advanced during a game by the operation of scoring finger contacts adapted to be hit by the playing element going down the alley. Thus for example, stepping switch D' and stepping switch E' together will handle the score ranging from 1 to 300 of one player while stepping switches D'' and E'' will handle the corresponding score for the other player.

Figure 5:
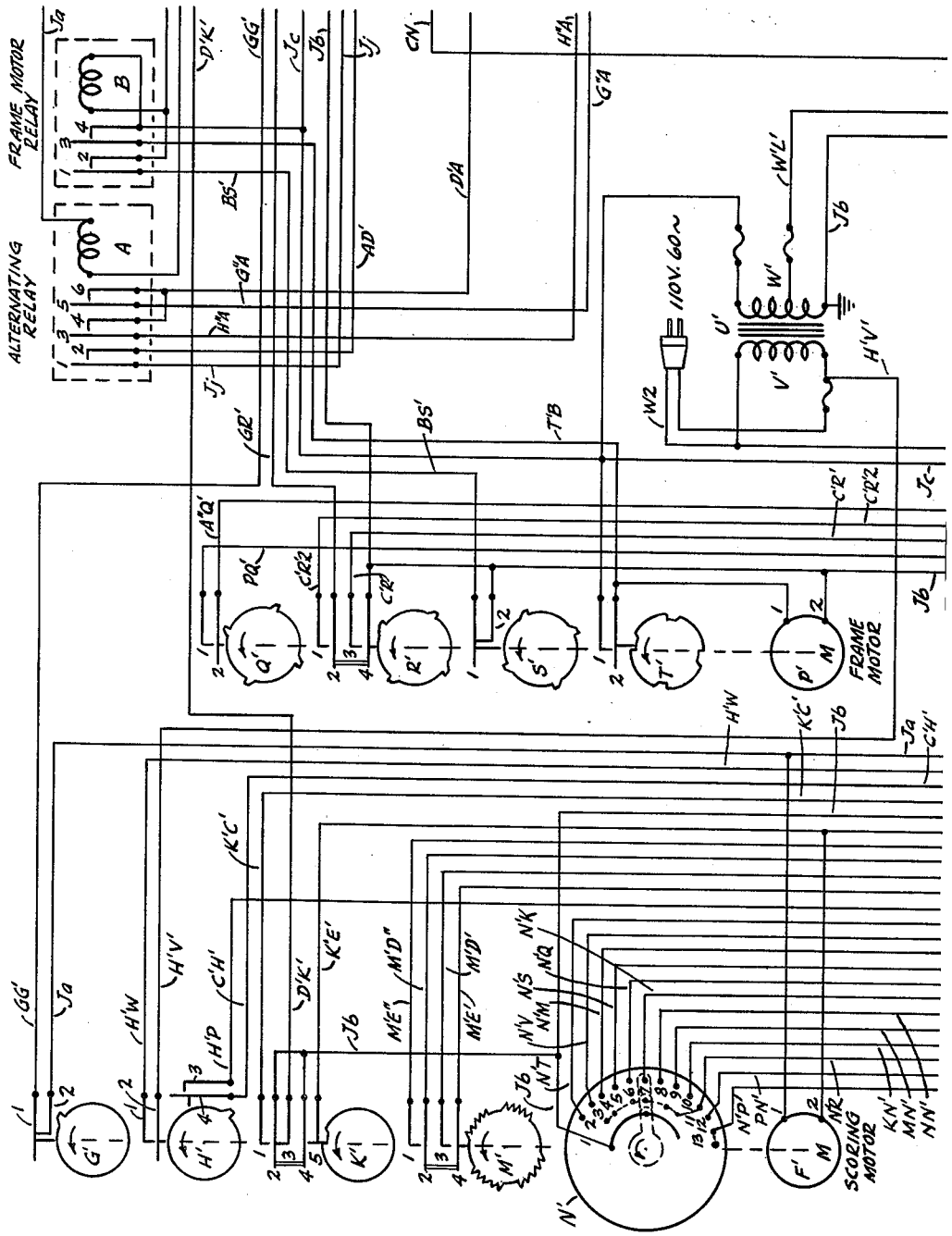
Figure 6:
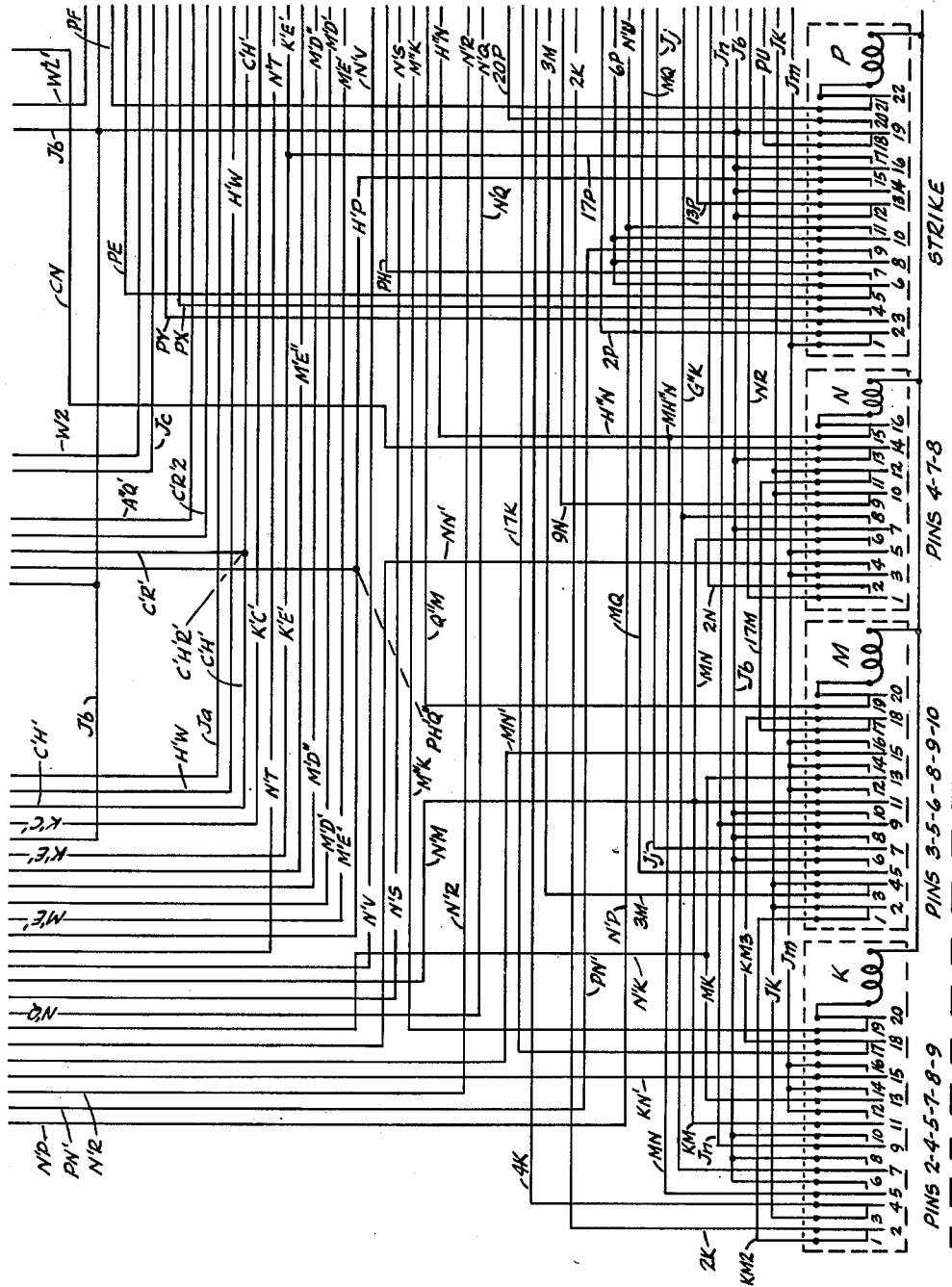
Figure 7:
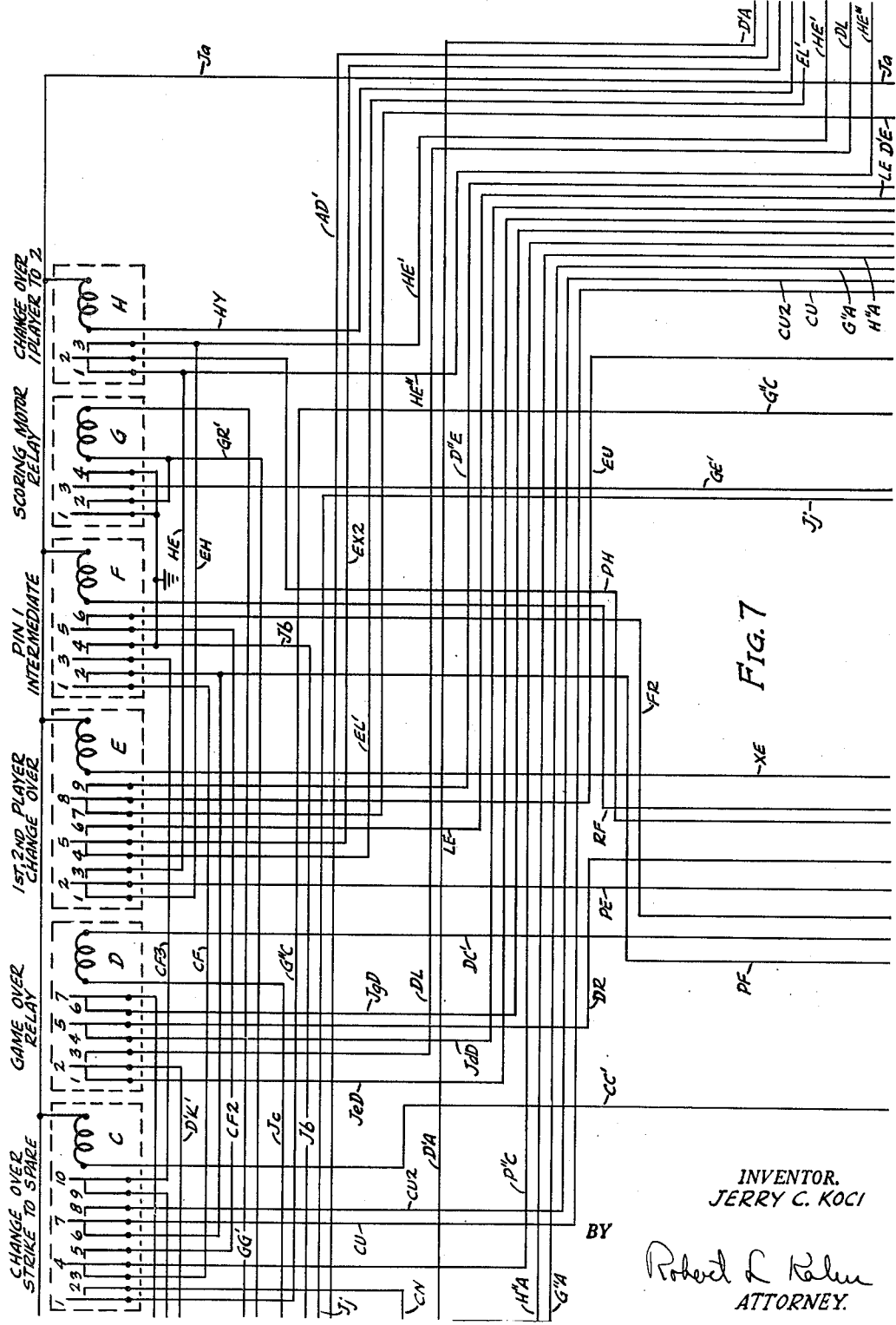
Figure 8:
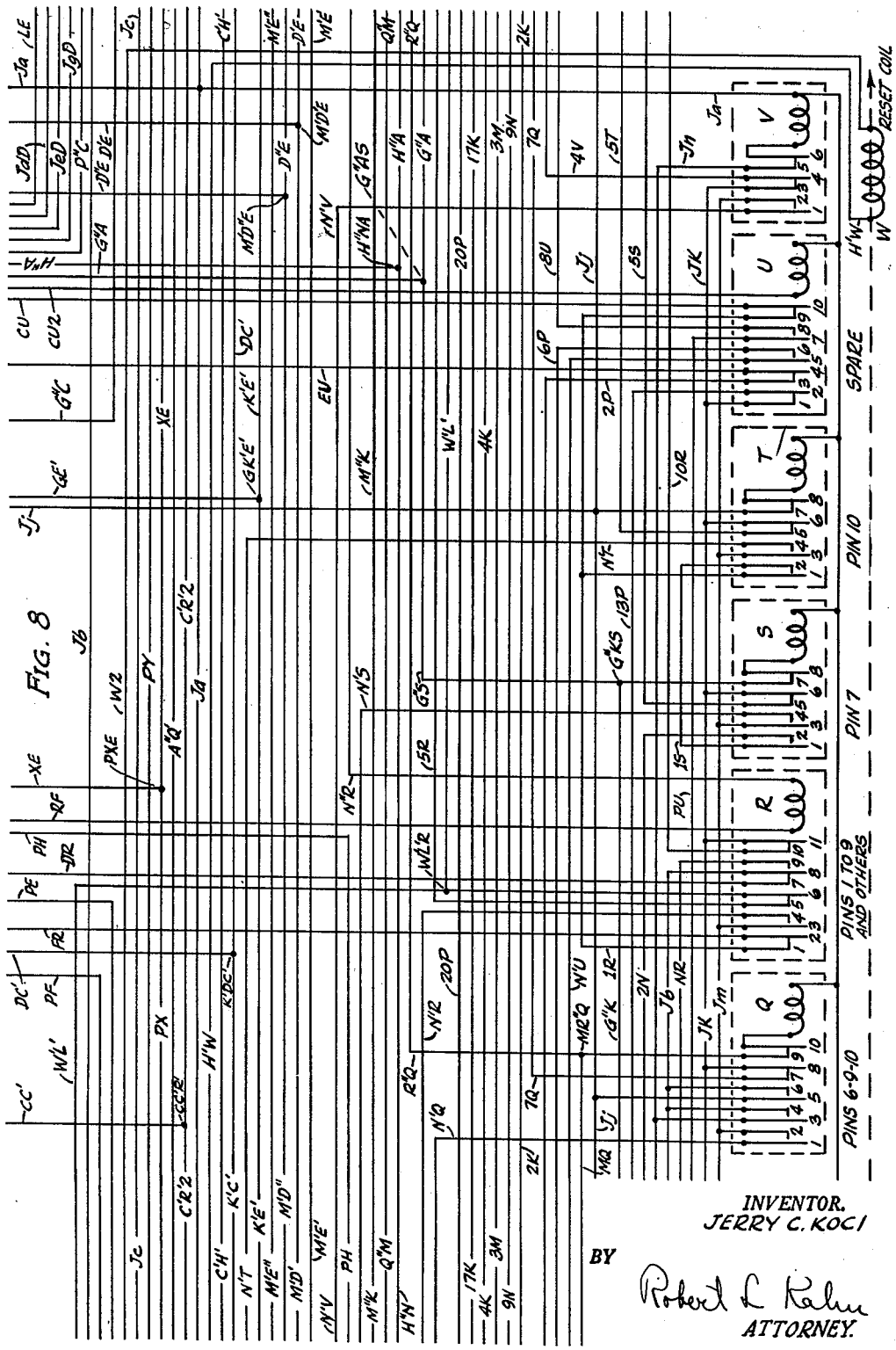

Two motor driven switch assemblies are provided, one such switch assembly generally controlling the scoring and being driven by scoring motor F' (Fig. 5). The other motor driven switch assembly relates generally to the frames and is driven by a motor indicated by P' (Fig. 5). Each of these two motor driven switch assemblies has a number of cams controlling switch fingers. The scoring motor also drives a wiper playing over a bank of contacts. This pulses stepping switches D' and E' or D'' and E''.

Scoring lights showing which pin or pins in the alley have been knocked down are provided, these lights being lit at the beginning of a frame to correspond to all pins being set up in an alley at the beginning of a frame. In the event of a strike, a bell rings and a light goes on showing that a strike has been made. If a spare occurs, a spare light goes on. For convenience, the various parts of the wiring are shown as interconnected through conventional plugs and sockets. The wiring numbers, however, remain the same and in order to provide some flexibility in showing the wiring in the drawing, the plugs and sockets are retained.

Referring back to when coin-operated switch A' (Fig. 9) is actuated, not only is stepping switch B' (Fig. 12) operated, but in addition, the remaining stepping switches are reset to zero so that the score and frame indications are ready for the beginning of the game. Relay W (Fig. 8) is also operated to return any of the interlocked relays to a normal unlocked position. Also both of the motor-operated switch assemblies are energized with the switches moving toward one of a number of possible home positions.

When a solo game is being played, it will be understood that the scoring is done by the two stepping switches D' and E' with frame stepping switch C' advancing in a conventional manner.

Before describing the circuit of the system in detail, certain mechanical parts of the system will now be taken up. Thus motor F' drives a series of elements for obtaining certain switching actions. Motor F' carries on its shaft cam disc G' having one rise which is adapted to momentarily open contact fingers G'1 and G'2 when the motor is energized. The way the parts are arranged, motor F' makes 360° for an operating cycle and stops with the parts arranged substantially as shown.

Cam disc H' also has one rise which cooperates with two differently located pairs of contact fingers H'1 and H'2 as one pair and H'3 and H'4 as the other pair. This disc is angularly displaced with respect to G' in order to obtain a desired sequence of operations. The motor shaft also carries disc K' having a cam slot as shown and cooperating with contact fingers as shown. The slot of K' is behind the rise of H' from an operating angle so that K' switch fingers will be operated at a time between H'1 and H'2 on the one hand and H'3 and H'4 on the other hand.

Motor F' also drives serrated cam disc M' having two groups of five serrations each. Disc M' is oriented so that normally the serrations are displaced from the series of contact fingers cooperating therewith. This disc serves to zero scoring stepping switches D' and D'' at the beginning of a game.

Motor F' also drives three wipers functioning as one mechanical and electrical unit. These wipers cooperate with a central grounding ring 1 carried upon a suitable insulating stationary disc N'. Beyond ring 1 is a series of contacts all connected together by a wire and indicated by numeral 11. A third series of contacts are numbered 2 to 13 inclusive. Contact 11 of the outermost series is connected to series 11. Contact 13 is in two parts, connected together as shown. The wipers are driven counterclockwise and one wiper plays over the contacts from 13 down. The second series of contacts numbered 11 actually has contact points only in line with contacts 3, 4, 6, and 9. Normally the wipers for N' are dead because the two outer series of contacts are in open circuits. These two outer series of contacts are connected to contacts in the bank of relays K to V inclusive and these contacts are normally open at the beginning of each frame.

Frame motor P' also drives a series of cam discs having fingers or slots as shown cooperating with contact fingers suitably numbered. The angular orientation of these cams and contact fingers is as shown and the reason for that will become apparent when the operation of the system is described.

Stepping switches D' and D'' are of the type having a single operating winding advancing a pawl and ratchet disc with wipers playing over a series of contacts. The mechanical construction of such stepping switches is well known and many are available on the market. In addition, these stepping switches as well as others here used carry one or more pins on the ratchet disc for operating on some contact fingers either at the beginning or end of the travel range of the ratchet disc as shown in Patent 2,222,217 for example. In some instances the contact fingers are operated just when the operating winding is energized. Thus in D', the lever system between the winding and pawl also operates certain contact fingers.

The wiring arrangement of switch D'' is clear from the drawing and will be described in the description of the wiring of the entire system. However, switch D' is wired differently. Thus D' has one outer series of stationary contacts 1 to 9 inclusive together with one contactless position subtending an arc of 120 degrees. Cooperating with these contacts are wipers 11, 12 and 13, 11 having one finger and 12 and 13 each having two fingers connected together and the three wipers being also 120° apart. All the wipers are connected together and grounded as shown. The inner wiper fingers cooperate with two series of inner contacts. One series running from 15 to 15j inclusive is connected together. The other series runs from 16 to 16j inclusive and is also connected togther. The two series are arranged so that the individual contacts alternate. Contacts bearing the same letter occupy adjacent wiper steps, adjacent pairs, however, being separated by a dead wiper step. Contacts 17 and 18 are connected together by a wire, these two contacts having 120 degrees between them, with contact 18 being two wiper steps away from contact 1. Contacts 17 and 18 are circularly aligned with contacts 1 to 9 inclusive. Thus as shown, contact 16g is radially aligned with contact 2. Contact 15g is radially aligned with contact 3. Then the inner series of contacts skip the space corresponding to contact 4 and the pattern repeats. It is understood that contacts 1 to 9 inclusive are successively engaged by successive advance of the wipers. The normal rest position of the switch when starting a game is as shown with the three wipers free of all contacts. Then one clockwise step of the ratchet (the normal direction of ratchet travel) will move wiper 12 a second step from contact 17, wiper 11 to contact 1 and move wiper 13 to contact 16. The fact that at contacts 1, 4 and 7 there are no corresponding inner contacts in the 15 and 16 series introduces the random scoring effect previously referred to and to be described in detail later.

The remaining stepping switches are wired as shown in the drawing. In connection with switch B', this only has two positions and the ratchet disc need only have two teeth. This stepping switch as well as E' and E'' are of the type having both operating windings for stepping the ratchet up against a spring and reset windings for releasing the ratchet discs back to starting position. Such a stepping switch follows the same general construction as the others and an example of this type of switch is shown in Patent 2,281,262.

Referring now to frame switch C', Figure 15 this is the same type as E' and E'' with operating and reset windings. This switch has two travel ranges against a spring and when reset the ratchet disc is returned to zero. The detailed wiring of this switch is shown in Figure 15. This switch has a series of fixed and movable contacts 1 to 7 inclusive and 8 and 9 which are operated in a conventional manner by a pin on the ratchet disc at the beginning and end of one travel range respectively. These contacts and their action will be described in greater detail later. In addition, there are terminals 10 to 25 inclusive which are wired up to wiper contacts. The wipers consist of three sets of wipers 26, 27 and 28 respectively. Wiper 26 consists of a single grounded blade extending to the outermost series of contacts upon the contact carrying disc. Wiper 28 consists of two leaves connected together but insulated from ground and wiping on the two outer series of contacts. Wiper 27 has three interconnected leaves insulated from ground and bearing upon the three series of contacts. The spacing between the closest individual contacts measures the travel for one step of the switch. Pin 29 carried by the ratchet disc retains contacts 1 to 7 inclusive in one normal position at the beginning of a game from which position the clockwise travel of the ratchet disc moves the pin away from these contacts and permits them to change. Pin 30 carried by the disc engages contact 8 and closes it against 9 to terminate the entire game. The maximum operating range of the switch is 40 steps, this being the maximum number of puck throws down the alley for a dual game. For a solo game, the range is cut down to 20 steps. The total number of teeth on the ratchet disc is 100 and the contacts are spaced and wired as shown.

Thus terminal 10 is connected to adjoining contacts 10a to 10c inclusive and to 10d spaced 40 steps away from 10a. Terminal 11 is connected to a group of four adjoining contacts 11a to 11d inclusive and also to a group of two contacts 11e and 11f just beyond 10d. Similarly terminals 12 to 19 inclusive are connected to four adjoining contacts of each group lettered a to d inclusive and to a pair of adjoining contacts e and f. Terminal 20 is connected to a continuous contact strip 20a extending from a point one step ahead of contact 10a (clockwise around the contact disc) to a point radially in line with 24a. A second contact ring 21a extends from a point radially in line with 10d to a point radially in line with 19f. Just beyond 19f clockwise on the contact disc is contact 25a connected to terminal 25. Beyond 25a is a group of twenty contacts 23a to 23w inclusive (letters i, l and o not being used) connected to terminal 23. Terminal 22 is connected to a third circular series of contacts 22a to 22w inclusive. Contact 22a is radially to the left of 10a with 22b in line with 10a. Contact 22c is in line with 11a. The contacts in the 22 series are in pairs with a blank index position space between adjacent pairs. Terminal 24 is connected to contact 24a in the outer ring just to the right of 19d and also to contact 24b radially in line with 25a.

Single contact wiper 26 controls the change over from one player to another in a dual game. Double contact wiper 28 is active for a solo game for controlling the frames. The remaining three contact wiper 27 is active in a dual game.

Energization of the operating winding results in the ratchet disc advancing one tooth against a spring. Energization of the reset winding releases the ratchet disc to return to zero position as shown. The angular spacing between wipers 26, 27 and 28 is as shown, the wipers being in the zero position.

Now specifically referring to the circuit shown in Figures 5 to 14 inclusive, the coin slide controls switch A' having seven contacts (Fig. 9). In this switch, as in the remaining portions of the system, the movable contacts will be shown as longer than the fixed contacts and for convenience, reference to these contacts will merely be by number. Thus switch A' has contacts A'1 and A'6 connected together, these two being connected by wire Jc to a terminal on plug pc. Contact A'2 is connected by wire A'Y also to a terminal of plug pc. Similarly contacts A'3, A'4, A'5 and A'7 are connected by wires A'Z, Jb, Ja and A'E' to terminals of plug pc. Bell coil A'' forming part of a bell or other signaling means to indicate a strike is connected by wire A''1 to wire Jc and by wire A''2 to wire A''Q' to a terminal of plug pc.

Now referring to socket sc (Fig. 11) the wires previously identified continue as follows: Wire A'Y goes to contact Y1 of relay Y and the lower terminal of the winding. Wire Jc connects various parts of the system. Thus conductor Jc is connected to the right terminals of the operating winding of stepping switch D' (Fig. 12) and the operating winding of stepping switch D'' (Fig. 11) to the top terminal of the operating winding of stepping switch C' (Fig. 11) contact C'2 of this same stepping switch, to the lower terminal of the operating winding of relay X (Fig. 13) to contact Y5 of relay Y, to the upper terminal of the operating winding of relay Z and to the left terminals of the operating windings of stepping switches E' (Fig. 14) and E'' (Fig. 13).

Returning to socket sc, wire A'Z goes to contact Z1 and the lower terminal of the operating winding for relay Z. Beginning again from socket Sc, wire A″Q′ goes to a terminal of plug pb. Again returning to socket sc, wire Ja goes down to a terminal of plug pa. Wire A′E′ runs from a terminal of socket sc to the lower terminal of the reset winding of stepping switch E″ and also to the lower terminal of the reset winding of stepping switch E′.

Returning to socket sc, wire Jb is a ground wire which goes to stepping switches D′ and D″ to a terminal of the operating and reset windings of stepping switch B′, to the ground on stepping switch C′, to contacts 1, 4 and 9 of relay X, to ground on stepping switches E′ and E‴, to every plug and socket and to practically every part of the entire system including transformer winding W′, and contacts on relays K, M, N, P, Q and R. Thus, referring to relay K, wire Jb ties the following contacts together; 6, 8, 10. In relay M contacts 6, 8 and 10 are tied together. In relay N, wire Jb is connected to contacts 7 and 13 and in relay P to contacts 12, 14, 16 and 19. In relay Q, wire Jb is connected to contacts 4 and 6, and in relay R to contact 8. Wire Jb is also connected to terminal 2 of motor P′, to contact 2 of switch finger S′2 and to contact R′4. Wire Jb continues to contact 4 of relay F and contacts 1 and 4 of relay G. Wire Jb also continues and is connected to contact N′1 and to contacts K′2 and 4.

Wire A″Q′ may be followed from plug pb to the corresponding terminal of socket sb to contact Q′2 of the switch fingers controlled by cam Q′. Wire Ja may be followed from plug pa to socket sa, and from there as a common return for the windings of relays A, C, E, F, H, relays K, M, N, P, Q, R, S, T, U, V, this same wire continuing to terminal F′1 and G′2 of the scoring motor assembly.

Referring now to the switch fingers operated by the puck, the switches are indicated as shown by capital letters with a double prime. Thus number 1 and 2 contacts of fingers F″ and T″ are connected together by wires JgD and Jb to terminals on plug pd. These two wires also connect contacts 5 and 6 of switches G″, H″, M″, P″ and contacts 3 and 4 of switches K″, N″, Q″, R″ and S″. It will be noted, that wire Jb in plug pd may be followed through socket sd right around to socket sa and socket sb to plug pa and plug pb and from plug pa to socket sc.

Going back to the switch fingers, contact 1 of switch G″ is connected by wire G″C to plug pd. Contact 2 of switch G″ is connected to contact 1 of switch H″. Contact G″3 is connected to wire G″A while G″4 is connected to H″4, M″4, N″2, P″2, S″2 and wire JeD to plug pd. H″2 and H″3 are connected by wires Jj and H″A to plug pd. K″1 and M″1 are connected to wire M″K on plug pd. K″2, M″2, P″2, Q″2 and R″2 are connected by wire JdD to plug pd. M″3 and P″3 are connected by wire P″C to plug pd. N″1 is connected by N″R to plug pd. P″1 and Q″1 are connected by wire Q″M to plug pd. R″1 is connected by R″Q to pd. S″1 is connected to wire Jj. These wires running from the switches to terminals of plug pd may be traced by refering to socket sd. Referring now to this socket, wire P″C runs to contact 4 of relay C. Wire G″C goes to C1. Wire JgD runs to contact 6 of relay D. The next wire Jb is a ground and has already been traced. Wire JeD runs to contact 1 of relay D. Wire JdD runs to contact 4 of relay D.

Wire N″R runs to the right hand terminal of the operating winding for relay R. Wire M″K runs to contact 19 of relay K. Wire Q″M runs to contact 19 of relay M. Wire H″A runs to junction H″NA. From this junction wire H″A runs to contact 3 of relay A. From junction H″NA, wire H″N runs to junction MH″N. From this latter junction one connection goes to contact 15 of relay N while another connection MN goes to contact 5 of relay K.

Wire R″Q goes to junction MR″Q. From this junction, one connection goes to contact 9 of relay Q. Another connection is made by wire MQ to contact 5 of relay M. Referring back to socket sd, wire G″A runs to junction G″AS. From this junction, wire G″A runs to contact 5 of relay A. Also wire G″S runs from this junction to junction G″KS. From this last named junction, a connection goes to contact 7 of relay S and another connection is made by wire G″K to contact 8 of relay N and also to contact 7 of relay K. The last wire from socket sd is Jj. This runs up to contact 1 of relay A. Wire Jj is also connected to contact 7 of relay T, to contact 5 of relay Q, and to contact 7 of relay M.

Referring now to plug pa (Fig. 11) the wires from this plug will be traced to the various parts of the system. Thus beginning with the top right hand terminal, wire M′E″ goes to contact 1 of stepping switch E″. This contact is normally closed against movable contact 2 which is grounded. Referring back to plug pa the next wire Ja has already been traced. The third wire from the plug is C′R′2 which goes to terminal 23 of stepping switch C′. The next connection on plug pa is ground wire Jb and this has already been described. Wire W′L′ extends from a terminal of plug pa to the left terminal of two lamps marked "Game Over" and "2nd Player" respectively. The "Game Over" lamp when lit indicates that the game is finished while the "2nd Player" lamp when lit indicates that a dual game is in progress.

Returning to plug pa wire DC′ goes to contact 5 of stepping switch C′. Wire D′E extends up to the left terminal of the operating winding for stepping switch D′. Wire EL′ from plug pa goes to the right terminal of the "2nd Player" lamp.

Referring now to the left row of contacts of plug pa and beginning with the top, wire M′E′ extends from the plug to contact 1 of stepping switch E′. This contact normally closes against grounded contact 2.

Returning to the plug, wire K′E′ is connected to contact 3 of stepping switch E′. At junction K′E′E″ on this wire a lead goes to contact 3 on stepping switch 5″. The third contact is connected by wire C′H′ to the lower terminal of the operating winding of C′. The next contact on the plug is connected by wire HE′ to contact 22 of stepping switch D′ and this same wire continues to the right terminal of the operating coil of stepping switch E′.

The next contact on the plug is connected by wire DL to the right terminal of lamp "Game Over." Wire XE extends from plug pa to contact 6 of relay X. Wire HE″ extends to junction HE″D″. From this junction a lead continues to the right terminal of the operating winding of stepping switch E″. From junction HE″D″ a connection goes to contact 22 of stepping switch D″. The next contact on plug pa is connected to wire Jc already described.

Referring back to plug pa, wire D″E goes to the left terminal of the operating winding for stepping switch D''. The last plug terminal is connected to two wires EX and LE. Wire EX goes to contact 10 of relay X. Wire LE goes to the right terminal of lamp "1st Player."

Referring now to socket sa (Fig. 9) the corresponding wires from the plug will be traced. These wires carry the same letters on both the plugs and sockets. Thus starting at the top and on the left hand column of terminals, wire M'E' extends to contact 4 of switch M'. The next contact on the socket is connected by wire K'E' to junction GK'E'. From this junction wire GE' extends to contact 3 of relay G. Returning back to this junction wire K'E' has a connection going down to contact 17 of relay P. This same wire K'E' is connected to contact 5 of switch K', and to contact 2 of scoring motor F''.

Returning to socket sa, wire C'H' goes to junction C'H'R'. From this junction, wire C'R' goes to contact 3 of switch R'. Returning back to junction C'H'R', wire C'H' goes to contact 4 of switch H'.

Returning to socket sa, wire HE' runs to contact 3 of relay H. Wire DL runs to contact 3 of relay D. Wire XE goes to junction PXE. From this junction, wire XE goes up to the left terminal of the operating winding for relay E. From junction PXE, wire PX goes to contact 4 of relay P. Returning to the socket, wire HE'' goes to contact 1 of relay H. From this same contact, wire HE goes to contact 3 of relay E.

Returning to socket sa, wire Jc is a junction wire and goes to the top terminal of secondary W' of the transformer. This same wire is also connected to contact 1 of switch T'. Wire Jc continues around and is connected to contact 4 of relay B and also to the right hand terminal of the winding of this same relay. This same junction wire continues around to the left hand terminal of the operating winding for relay D.

Returning to the socket, wire D''E goes to junction M'D''E. From this junction, wire D''E goes to contact 9 of relay E. From this junction, wire M'D'' goes to contact 2 of switch M'. Wire LE goes to contact 6 of relay E. Going to the right hand column of terminals on socket sa, the top terminal is connected to wire M'E''.

Returning back to socket sa, wire C'R'2 goes to junction CC'R'. From this junction, wire CC' goes to the left terminal of the operating winding for relay C. Wire C'R'2 goes to contact 1 of switch R'. The next terminal on socket sa is connected to junction wire Jb which wire has been previously followed through. Wire W'L' goes to junction W'RL' from which point a lead 6R goes down to a contact on socket se. Wire W'L' continues to junction W'L'R. From this junction a lead goes down to contact 6 of relay R while a lead goes up from this junction to an intermediate terminal of secondary W' of transformer U'.

Referring back to socket sa, wire DC' goes up to junction K'DC'. From this junction, wire DC' goes to the right terminal of the operating winding for relay D. Returning back to the junction, wire K'C' goes to contact 1 of switch K'.

From socket sa, wire D'E goes to junction M'D'E. From this junction, wire D'E goes to contact 7 of relay E. From this same junction, wire M'D' extends to contact 3 of switch M'. The last terminal on the socket is connected to wire EL'. This wire goes to contact 4 of relay E.

Referring now to switch G' (Fig. 5) contact 1 is connected by wire GG' to the right terminal of the operating winding for relay G. Contact 2 of this same switch is connected to junction wire Ja previously described.

Referring now to switch H', contact 1 is connected by wire H'W to the left terminal of the operating winding of the reset relay W. Contact 2 of this same switch H' is connected by wire H'V' to the lower terminal of primary winding V' of transformer U'. Returning to H', contact 3 is connected by wire H'P through junction PH'Q'' to contact 15 of relay P. Contact 4 of switch H' is connected by wire C'H' to various parts of the system as previously described.

Referring now to switch K', the connections for contacts 1 to 5 inclusive have already been described. The same applies to contacts 1 to 4 inclusive of switch M'.

Referring now to the terminals of N', these are numbered 1 to 13 inclusive. Terminal 1 has already been described as connected to junction Jb. Terminal 2 is connected by wire N'T to contact 4 of relay T. Terminal 3 of the series of contacts in N' is connected by wire N'V to contact 1 of relay V. Terminal 4 of N' is connected by wire N'M to contact 11 of relay M. Wire N'M' is connected by wires KM and MN to contacts K11 and N5 respectively. The fifth terminal of this bank is connected by wire N'S to contact 4 of relay S. The next terminal 6 is connected by wire N'Q to contact 1 of relay Q. The seventh terminal is connected by wire N'K to wire MK connecting K13 and M13.

Terminal 8 of the switch bank is connected by wire NN' to contact 4 of relay N. Terminal 9 of N' is connected by wire MN' to contact 15 of relay M. The tenth terminal is connected by wire KN' to contact 15 of relay K. The eleventh terminal is connected by wire N'R to contact 4 on relay R. Terminal 12 of N' is connected by wire PN' to contact 9 of relay P. The thirteenth terminal of N' is connected by wire N'P to contact 11 of relay P and by wire N'U to contact 5 of relay U.

Referring now to the switches controlled by frame motor P', the contacts in switch Q' have been already considered. In switch R', the wires to the four contacts have also been described. For switch S', contact 1 is connected by wire BS' to contact 1 of relay B. The connection for contact 2 of switch S' has been described.

Referring now to switch T', contact 1 is connected to junction wire Jc which wire has already been traced. Contact 2 of switch T' is connected to contact 1 of motor P'. Contact 2 of switch T' is also connected by wire T'B to contact 3 of relay B. The number 2 contact of frame motor P' has already been described as connected to junction wire Jb.

Referring now to the primary V' of the power transformer, this is connected to a conventional plug for application to a socket of a conventional 110 volt 60 cycle circuit. The lower wire of this plug is connected to the lower terminal of the transformer primary through a fuse. The upper terminal of this plug is connected by wire W2 to the upper terminal of the transformer primary and also to the right terminal of reset relay W.

Referring now to relay A, contact 1 is connected to junction wire Jj. This wire connects contacts M7, Q5, T7, and continues to socket sd (Fig. 9). The remainder of Jj through plug pd has already been traced. Contact A2 is connected by wire AD' through socket sb and plug pb to D'15 (Fig. 12). Contact A3 is connected by wire H''A to junction H'' NA and has been traced. Contact A4 is connected to A6 and this latter contact is connected by wire D'A to D'16. Contact A5 is connected by wire G''A to junction G''AS and has already been traced. The left terminal of the A winding is connected to C9.

Relay B has contact B1 connected to wire BS' and to S'1. B2 is connected to the left terminal of the B winding and to D7. B3 is connected to T'B, previously traced. B4 is connected to the right terminal of the B winding and also to junction wire Jc going to the high side of transformer secondary W'.

In relay C, C2 is connected by wire CN to N14. C1 is connected to wire G''C already traced. C3 is connected by wire CF to F1. C4 is connected to wire P''C going to socket sd and has been traced. C5 is connected by wire CF2 to F5. C6 is connected by a jumper to F2 and to wire PF going to P21. C7 is connected by wire CU to U10. C8 is connected by wire CU2 to the left terminal of the winding for relay U. C9 has already been considered. C10 is connected by wire CF3 to F3. The left terminal of the C winding is connected by wire CC' to junction CC'R' and has already been traced.

Relay D has contact D1 connected by wire JeD to socket sd and has been traced. D2 is connected by D'K' to K'3, as previously described. D3, D4, D6 and D7 have already been traced. D5 is connected by wire DR to contact R7. The left terminal of the winding for D is connected to Jc.

Contact E1 is connected by wire EH to H3. E2 is connected by wire PE to P5. E3 is connected by wire HE to H1. E4 has already been traced to socket sa. E5 is connected by wire EX2 to socket sb, then plug pb to X3. E6, E7, E9, and the left terminal of the E winding have been traced. E8 is connected by wire EU to U4.

Contacts F1 to F5 inclusive have already been traced. F6 is connected by wire FR to R2. The left terminal of the winding for F is connected by wire RF to the left terminal of the winding for relay R.

Contacts G1 and G4 are grounded to Jb. G2 and the left terminal of the G winding and G3 have already been considered.

Contact H1 has already been traced. H2 is connected by wire PH to P7 and H3 has been previously considered.

Referring now to relay K, contact 1 of this relay is connected to contact 1 of relay M by wire KM2. Contact 2 of this relay K is connected by wire 2K to a terminal on socket se. Contacts K3, M2, M4, N10, N12, Q3, R11, S6, T6, U1 and V3 are connected to bus-bar Jk. Contact 4 is connected by wire 4K to a terminal on socket se. The connections for contacts 5, 6, 7, 8, 10, 11, 13, 15 and 19 have already been described. Contacts K9, M9, Q3 and V5 are connected together by wire Jn. Contacts K12, K14, K16, M12, M14, M16, N3, N5, P1, Q2, R3, S3, T3 and V2 are connected by wire JM. Contact 17 of relay K is connected by wire 17K to a terminal on socket se. Contacts K18 and M18 are connected by wire KM3. Contact 20 of the relay is connected to the left terminal of the operating winding for this relay.

Referring now to relay M, contacts 1, 2, 4, 5, 6, 7, 8, 9, 10, 11, 12, 13, 14, 15, 16, 18, 19 have already been described. Contact 3 of this relay is connected by wire 3M to a terminal of socket se. Contact 17 of relay M is connected by wire 17M to contact 11 of relay N. Contact 20 of relay M is connected to the left terminal of the operating winding for this relay.

Referring now to relay N, contacts N1 and R9 are connected by wire NR. Contacts N2 and S2 are connected by wire 2N. Contacts 3, 4, 5, 6, 7, 8, 10, 11, 12, 13, 14 and 15 have already been considered. Contact 9 of relay N is connected by wire 9N to a terminal on socket se. Contact 16 of relay N is connected to the left hand terminal of the operating winding for this relay.

In relay P, contacts 1, 3, 4, 5, 7, 9, 11, 12, 14, 15, 16, 17, 19 and 21 have been considered. Contact 2 of this relay is connected by wire 2P to contact 3 of relay U. Contacts 6, 8 and 10 are connected by wire 6P to contact 6 of relay U. Contact 13 of relay P is connected by wire 13P to contact 2 of relay U. Contact P18 is connected by PU to U7. Contact 20 of relay P is connected by wire 20P to a terminal on socket se. Contact 22 of relay P is connected to the left terminal of the operating winding for this relay.

Now referring to relay Q, contacts 1 to 6 inclusive, 8 and 9 have already been described. Contact 7 is connected by wire 7Q to a terminal of socket se. The end contact 10 of this relay is connected to the left terminal of the operating winding for this relay.

In relay R, contact 1 is connected by wire 1R to contact 1 of relay T and contact 9 of relay U. The connections for contacts 2 to 4 inclusive and 6, 7, 8, 9 and 11 have already been considered. Contact 5 of relay R is connected by wire 5R to a terminal of socket se. The next contact of relay R which has not been considered is 10 and this is connected by wire 10R to a terminal of socket se.

Referring now to relay S, contact 1 of this relay is connected by wire 1S to contact T2. Contact 5 of relay S is connected by wire 5S to a terminal of socket se. Contact 8 of relay S is connected to the left terminal of the operating winding for this relay. The remaining contacts of relay S have already been accounted for.

Now referring to relay T, contact 5 of this relay is connected by wire 5T to a terminal of socket se. Contact 8 of relay T is connected to the left hand terminal of the operating winding for this relay. The remaining contacts of relay T have already been considered. Contact 8 of relay U is connected by wire 8U to a terminal of socket se. Otherwise the connections for U have been accounted for.

Referring now to relay V, contact 4 of this relay is connected by wire 4V to a terminal of socket se. Contact 6 of this relay is connected to the left terminal of the operating winding for this relay.

Referring now to plug pe (Fig. 10) the continuations of the wires from socket se will now be traced. Wire 5R is common to pin lights 1, 2, 3, 5, 6, 8 and 9 while 6R is common to pin lights 4, 7, 10, spare and strike. Wires 10R, 4K, 3M, 9N, 2K, 7Q, 5S, 17K, 4V, 5T are connected to pin lights 1 to 10 respectively. Wires 8U and 20P go to the spare and strike lights respectively.

Stepping switch B' (Fig. 12) has only two positions. This switch has a reset winding which permits the switch to zero to a solo position upon one operation of switch A'. The second operation of A' causes the operating winding of B' to advance the switch to a dual play position. This switch B' has contact 1 grounded to Jb. Contact 2 is connected by wire B'C' to contact C'6 (Fig. 11). These contacts 1 and 2 of B' are open in the solo position and closed in the dual position by means of a pin on the ratchet disc. The switch is shown in the solo position. The operating winding of B' has its right terminal connected by wire B'Z to contact Z6 (Fig. 13). The left terminal of the B' operating winding has already been accounted for. The top terminal of the B' reset winding is connected by wire ZB' to contact Z4. The left terminal of the C' reset winding (Fig. 11) is also connected to Z4, the right terminal of the C' reset winding being grounded. Thus both B' and C' are reset simultaneously.

Referring again to B', grounded two blade wiper 6 (driven by the ratchet disc) cooperates with two pairs of stationary contacts 12, 13 and 14, 15. Contact 12 is connected by wire 12B' to the top terminal of the winding for relay Y (Fig. 13). Contact B'13 is connected by wire 13B' to the right terminal of the "1 Player" light. Contact B'14 is connected by wire 14B' to the top terminal of the winding for relay X (Fig. 13). Contact B'15 is connected to the right terminal of the "2 Players" light.

Referring now to stepping switch C', this has external terminals 1 to 25 inclusive as well as connections for both operating and reset windings. The connections for the reset and operating windings have already been described. Terminal 1 of stepping switch C' is connected by wire 1C' to contact 3 of relay Z. Terminal 2 is connected to wire Jc. Terminal 3 of this stepping switch is connected by wire 3C' to contact 2 of relay Y. Terminal 4 of the stepping switch is connected by wire to terminals 9 and 24 of the stepping switch. Terminal 5 of this stepping switch is connected to wire DC' previously traced. Terminal 6 of this stepping switch is connected to wire B'C' while terminal 7 of the stepping switch is connected by wire 7C' to contact 2 of relay Z. Contact 8 of the stepping switch is grounded.

Terminals 10 to 19 inclusive of stepping switch C' are connected by wires 10C' to 19C' to frame lights 1 to 10 inclusive, these lights indicating the number of the frame being played. Terminal 20 of stepping switch C' is connected by wire 20C' to contact 3 of relay X. Terminal 21 of the stepping switch is connected by wire 21C' to contact 5 of relay X while C'22 is connected by wire 22C' to contact 7 of relay X.

Terminal 23 of the stepping switch is connected to wire C'R'2. Terminal 24 has already been considered and C'25 is connected by wire 25C' to contact 2 of relay X.

Referring now to relay X (Fig. 13) contacts 1, 4, and 9 are connected together to ground wire Jb. The remaining contacts and connections for the operating winding for this relay have already been traced.

Now referring to relay Y, contact 1 is connected to the lower terminal of the operating winding for this relay and as previously indicated is connected to wire A'Y. Contact 6 of this relay is connected to the top terminal for the operating winding of Z, these two being connected to supply wire Jc. Contact Y7 is connected to contact 5 of relay Z. The remaining contacts for relay Y have already been traced.

Now referring to relay Z, the lower terminal of the operating winding for this relay is connected to contact 1 which is also connected to wire A'Z. The remaining connections for this relay have already been traced. Referring now to stepping switch D', contacts 1 to 9 inclusive are connected by wires 1D' to 9D' to lamps 1 to 9 inclusive for showing the score of the first or solo player. Terminals D'15 and D'16 have already been considered. This switch has two contacts 21 and 22 which are normally open but closed against each other when the operating winding is energized. Contact 21 is connected to contacts 17 and 18 of the switch. Contact 22 and the two terminals of the operating winding have already been considered.

Stepping switch D" (Fig. 11) is similar to D' as far as external connections are concerned. Thus D"1 to D"9 inclusive are connected by wires 1D" to 9D" to lamps 1 to 9 inclusive of the second player score indicator. The remaining connections are similar with D"21 being connected to D"17 and D"18 and D"22 being connected to wire HE" at junction HE"D" as previously pointed out. The connections for the operating winding of D" have already been described.

Stepping switches E' and E" are also similarly connected, these switches handling score values about 9. Thus E' has contacts 2 and 4 grounded to Jb. Contacts 1 and 3 have already been considered. Contact E'5 is connected to the top terminal of the reset winding. Stepping switch E' is a conventional scoring switch and has contacts and wipers for handling scores from 10 to 300 in units of tens. Thus E' has single blade wipers 6 and 7 and a double bladed wiper 8. An outer series of contacts 10 to 90 inclusive is provided. Inner contacts 100, 200 and 300 are provided. The angular extent of the series 10 to 90, and the angular extents of each of contacts 100, 200 and 300 are so related to each other and the ratchet step angle that for each single ratchet disc advance the score is increased by 10. Thus as shown, the switch is in what may be termed a minus zero position. To steps clockwise, wiper 8 will engage contact 10. Each of the contacts is connected to one terminal of a corresponding score lamp for the first player. Wiper 8 is advanced by successive steps to 90 and the next advance of 8 will bring the shorter blade onto contact 100. At the same time wiper 7 will be advancing to contact 10 so that after 100, the next wiper advance due to ratchet action will cause wiper 7 to touch contact 10. This will continue till wiper 7 is at 90 and wiper 8 is at the end of 100. The next step of E' will cause wiper blade 6 to be one step before 10 and wiper 8 to be on the 200 contact. Wiper 7 will be dead. Further steps of E' will advance wiper 6 over the ten series of contacts while wiper 8 presses on the 200 contact. The final step will be when wiper 6 goes one step beyond 90 and permits wiper 8 to contact the 300 strip. This is the end of the travel range for the switch. It is understood that each time the operating winding is energized, the ratchet is advanced, the wipers being attached to the ratchet. The energization of the reset winding will permit the ratchet to return in response to the spring bias, the return position being a minus zero position, as shown. In this position contacts 1 and 2 engage and 3 and 4 engage. After E' has advanced one step clockwise, finger 4 is moved against 5 and the remaining fingers are open. Fingers 2 and 4 are grounded to Jb while the remaining fingers have already been considered.

The second player scoring switch E" is connected similarly and the construction and operation are also the same.

A general description of the operation of the system will now be given with a detailed description and tracing of circuits to follow later.

Irrespective of the condition of the game, i. e. whether a preceding game has been played completely or not, as long as the game was started, the operation of switches A' will always have the same results. Thus the first operation of these switches will result in stepping switch B' remaining on or moving back to the solo playing position. Switch B' actually has its reset winding energized when switch A' is in the first reset position. Upon release of A' after the first operation, nothing happens to B'. In distinction to this, upon the second reset movement of A', switch B' moves to the dual play position only after A' has been released.

For convenience, the reset position of A' for solo play will be referred to as solo reset and the corresponding release will be referred to as solo release. The dual position at the second operation of switch A' will be correspondingly designated. In the solo reset position of A', the reset windings of stepping switches E' and E'' are energized causing these switches to return to what may be termed a minus zero position. Release of A' for either solo or dual play results in switches D' and D'' stepping to a home normal position. When D' and D'' reach a predetermined normal zero position, they cause switches E' and E'' to advance from their minus zero position to a normal zero position in readiness to register scores for a game. The advance of switches D' and D'' is caused by a motor operated interrupter switch to be described later.

Switch D' has a ten position range, this corresponding to 1 to 9 and a zero position for stepping-up switch E' one step. Switch D' has a wiper and contacts controlling lamps for scores 1 to 9 while switch E' controls lamps for scores 10 to 90, then 100 to 300, all as indicated. These two switches D' and E' keep score for a solo player. The other two switches D'' and E'' are similar and keep scores for a second player in dual play.

Switch D' differs in one important particular from its counterpart D''. Both switches are so arranged that the wipers move 120° for what might be termed 360 electrical or operating degrees. That is one-third of a turn of the wipers in these switches will cause them to cover the scoring range from 0 to 9 inclusive. However, switch D' has some difference in the three 120° ranges. Through additional contacts on this switch, and the fact that there are several additional wipers, it is possible to obtain different scoring values for the same play. This is true providing that switch N'' representing pin 1 in the alley is hit. Under such conditions, sometimes only pins 4 and 7 will be left, or only 10 will be left or only 4, 7 and 10 will be left depending upon the wiper position of switch D'.

Upon initial reset of switch A', stepping frame switch C' will be reset to zero from whatever previous position it had. This stepping switch is so arranged that ten solo or ten dual frames are provided for a complete game, after which the entire system is rendered inoperative for further playing. For dual play the switch advances two steps for each frame per player. In both types of play, the switch covers a certain operating range corresponding to 10 frames. Once the switch has moved from its zero position, a "game over" relay may be closed by a pair of switch contacts operated by the ratchet of C' when it has reached the predetermined end of its range. When a strike is made, C' advances two steps for the first puck of the frame.

Upon reset of A' for either solo or dual play, switches E' and E'' are reset to a minus zero position. In that position, certain contacts are closed by both of the two switches which energize the scoring motor F'. This motor drives some wipers and cams for accomplishing the following: One cam and contacts controlled thereby maintain the motor energized for an operating cycle after which the motor cuts itself off. Another set of cam controlled contacts operate relay winding W for clearing all scoring relays K, M, N and P to V inclusive to a normal position. Other contacts advance frame switch C' one step or two steps (for a strike). Cam M' with serrations closes certain contacts 10 times for each operating cycle. These contacts are only effective to step switches D' and D'' to a zero position. Switches D' and D'' will thus be zeroed from whatever position they had. If the zero position is reached with the first few operations of the contacts, the stepping switches are idle, having cut themselves off. Contact disc N' with a wiper serves to control the advance of switches D' and D'' (when dual play is present) for scoring purposes. This disc has thirteen terminals. Nine contacts control the 1 to 9 score while the others are for 10, 20 and 30 and ground. The 20 score is for a spare and the 30 score is for a strike. These contacts control stepping switches D' and D'' by the fact that as the disc wiper runs over the contacts, switches D' and D'' are stepped up till wiper N' reaches a dead contact. The wiper itself is driven through a complete range every time motor F' operates. Motor F' is operated every time A' is operated, for every play whether a score is added or not.

During play, switches F'' to H'' and K'', M'', N'' and P'' to T'' inclusive may be actuated by pucks. End switches F'' and T'' only serve to advance the frame count without scoring, this corresponding to a ball down the gutter in a real alley. The remaining switches control pin lights as indicated. When these switches are actuated, the lights corresponding to these pins are extinguished, corresponding to pins down. Switches M'' and P'' must be struck in conjunction with switch N'' for a strike; i. e. M'' and N'' or P'' and N''. When a strike is obtained, 30 is scored immediately and bell A'' rings. In a real game, this is not necessarily true, the score addition depending upon what happens to the two succeeding balls.

During the game, every time any pin or frame switch is operated frame motor P' is energized. This motor has several cam controlled contacts. One pair is a motor hold to keep the motor energized during its operating cycle. Another pair is for motor F' for actuating the scoring and other means previously described. In case of a strike, the bell circuit is controlled by still other contacts. Then certain contacts advance the frame control stepping switch C' in case of no score.

Through the operation of certain relays after each frame, in a dual game, "change over" relay E is operated. This relay serves to direct scoring pulses to the proper one of the two scoring switches for the two players.

The detailed operation of the system with circuits traced will now be given.

Referring to A', contacts A'1 and A'2 close on solo release to complete a circuit to energize relay Y. This circuit may be traced as follows: bus Jc (from the high side of the transformer) to A'6, A'1, A'2, A'Y through plug pc and socket sc, Y1 and the lower terminal of the Y winding, through the Y winding, wire 12B' to B'12 and through the wiper in B' to ground.

Still referring to A', during reset, contacts A'3 and A'4 close a circuit for relay Z. Thus A'4 is connected to ground wire Jb. Hence the circuit runs from ground to A'4, A'3, wire A'Z through the Z winding to supply wire Jc. If C' is stepped up at all, contacts C'7 and C'6 are closed, these contacts being open at the zero position of C'. If the previous game has been dual, B' will have B'1 and 2 closed. Thus a holding circuit for Z will be established until B' is moved back to solo and C' is moved back to zero. This holding circuit is as follows: wire Jc through the winding of Z, Z1 and Z2, wire 7C', contacts C'7 and 6, wire B'C' through B'2 and 1 to ground.

The closure of Z completes a circuit for resetting B'. Thus starting with ground wire Jb at B' reset winding, the circuit goes through the reset winding of B', wire ZB', contacts Z4 and Z3, wire 1C', contacts C'1 and C'2 (this is before C' has returned to zero) to supply wire Jc. It will be noted that at the second operation of the coin switch A' for dual play, the reset circuit for B' will be dead due to the fact that C' will be at zero position. Also if the previous game has been solo, contacts B'1 and 2 will be open so no reset of B' will occur at the first operation of A'.

If now A' is operated again for dual play, relay Z will again be attracted. From the solo reset, relay Y will be closed by the following circuit. Ground at B', wiper B'6, B'12, 12B' winding for Y, Y1 and Y2, wire 3C', contacts C'3 and C'2 (these two contacts are closed after C' has reached zero position) and supply wire Jc. Hence, when Z closes for the second time, a circuit for stepping B' to dual position is completed. This is as follows: ground through the operating winding of B', wire B'Z, contacts Z6, Z5, then by jumper to contact Y7 and then to Y6 to supply wire Jc. When the wiper for B' moves to the dual position, the connection between wiper 6 and contact B'12 is broken, thus releasing Y.

Upon dual play, wiper 6 of switch B' rests on contact 14 and completes a circuit for the winding of relay X, thus energizing the same. This closes contacts X6 and 7 in a circuit for energizing relay E on alternating frames. In this circuit wire 22C' goes to the 22a—w series of contacts. These contacts are arranged in pairs spaced from adjoining pairs. When wiper 27 is moved during frame advance, a circuit from terminal 22 of C' is completed by wiper 27 for two frames and uncompleted for two succeeding frames. When the circuit is completed, relay E will be closed to score one player's moves. When the circuit is incomplete, relay E opens to score the other player. Relay E directs scoring pulses to alternating scoring systems to enable each player to make his own score.

When wiper 27 from C' is between contacts in the 22 series, the frame stepping switch C' is stepped along by the same circuits as during solo play. When Y is energized during a solo game, relay H has its winding energized. This circuit is as follows: ground wire Jb, Y3, Y4, wire HY, plug pb and socket sb, wire HY to the winding of relay H and thence to bus-bar Ja, through socket sa and plug pa along wire Ja to A'5 and A'6 (these two are normally closed) to supply wire Jc. For solo play relay H remains energized throughout the game and remains dead for a dual game. When relay H is energized, contacts H2 and 3 provide a score actuating circuit through the operating winding of solo scoring stepping switch E'. When relay H is dead, contacts H1 and 2 permit the second player circuit through the operating winding of E'' to function, the actual control of E' and E'' being now governed by relay E which alternately goes back and forth for each player.

When A' is at reset position either for solo or dual game, contacts A'6 and A'7 close. This energizes the reset windings of stepping switches E' and E'' for counting from 10 to 300. Thus A'6 is connected to supply wire Jc. The circuit continues through A'7 along wire A'E' through plug pc and socket sc to the lower terminals of the reset windings for E' and E'' through these windings to contacts E'5 and E'4 to ground and similarly through E''5 and E''4 to ground. In both of these stepping switches, the five contacts are operated by pins upon the ratchet discs. The action is the same in both. Thus, when the ratchet disc has been stepped up from its extreme reset position, contacts 5 and 4 are closed, the remaining contacts being open. When the reset winding is energized—assuming that the stepping switch has been stepped up—the ratchet disc returns to its extreme reset position and the contacts are in the condition shown; 1 and 2 engaging, 3 and 4 engaging and 5 dead. As will be explained in detail later, when A' is released, E' and E'' always step up one tooth from the extreme reset position so that in practice, both E' and E'' will always go to a reset position even though they are in a non-scoring position.

Both E' and E'' are similar in respect to their action under A'. When A' is reset (for either solo or dual) contacts E'4 and 3 close. Contact E'4 completes a scoring motor energizing circuit as follows: ground at E'4, E'3, wire K'E', through plug pa and socket sa, along wire K'E' to terminal F'2 of the scoring motor and through the motor to Ja, socket sa, plug pa, by jumper to socket sc and plug pc along wire Ja to A'5, A'6 to supply wire Jc. Thus motor F' starts up. After cam K' has turned and caused contacts K'5 and 4 to engage, a motor energizing circuit is established to keep the motor going through one cycle. Thus instead of depending upon K'E' and contacts E'4 and 3, the ground circuit may go from F'2 along K'E' to K'5 and K'4 to ground wire Jb.

Upon operation of motor F', cam H' closes H'1 and H'2 to complete an operating circuit for the winding of relay W. It will be remembered that relay W is mechanically interlinked with relays K to V inclusive so that these relays are reset by W. This circuit is as follows: lower terminal of power transformer primary V' (to one terminal of the 110 volt supply plug) along wire H'V' to H'2 and H'1, wire H'W through the winding of relay W along wire W2 and thus to the other side of the transformer primary V'. Hence all interlinked relays will be reset and all pin lights energized. The light circuits will be detailed later.

The remaining contacts operated by cams H' and K' are not of importance during the initial step of setting up the game in preparation for play. Referring now to cam M', this steps up scoring stepping switches D' and D'' to bring them to a zero position. Thus referring to contacts M'3 and 4, every time these contacts are closed by a serration on cam M' the following circuit is established; ground at contact E'2, E'I, wire M'E' to plug pa, socket sa, wire M'E' to contact M'4, contact M'3, wire M'D' to junction M'D'E thence along wire D'E to socket sa, plug pa, wire D'E through the operating winding of D' and thence to supply wire Jc. It must be remembered that while M' is pulsing D' and D'' that E' and E'' are at reset with contacts 1 and 2 closed and contacts 3 and 4 closed. Hence each time a serration closes the contacts for M', stepping switch D' is advanced up to the position shown. Each time that the operating winding D' is energized, contacts D'21 and 22 are closed. Assume that a wiper, say D'12, reaches contact D'17 in its clockwise travel. Contact D'17 becomes grounded. A circuit can be traced from these two contacts along wire HE' through the operating winding of E' to supply wire Jc. This causes E' to advance one tooth from its reset position and change the condition of contacts E'1 to 5. Thus E'1 and E'2 are separated and there is no longer an operating circuit for D' to advance under the closing of M' switches. Thus D' takes its last step by moving wiper 12 away from contact 17. Hence, when M' goes through its pulsing cycle, D' and E' are operated as described. The action of M'2 and 1 is exactly the same on stepping switches D'' and E'', the connections and wires being identical except for the primes.

Rotary switch N' controls the stepping of switches D', D'', E' and E'' only after a frame has been played. When the game is being prepared for playing by operating A' either for solo or dual play, the switching at N' is idle. The frame motor P' is not operated during the zeroing in of the game. All the pin lights are on, and the light to indicate whether one or two are playing is also on.

Thus, with reference to one or two player lights, switch B' controls this. For one or solo play, the wiper grounds contact B'13 while for dual play the wiper grounds contact B'15. The circuit for these two lamps may be traced along wire 13B' (or 15B') through the lights to the common bus-bar for all the scoring lights 1 to 9 and 10 to 300 and along wire W'L' through plug pa and socket sa to the intermediate terminal on transformer secondary W'.

Referring now to the pin lights, pins 8, 2, 5, 1, 3, 9 and 6 have a common connection to wire 5R. This may be traced through plug pe and socket se to wire 5R and contact R5. At the beginning of the game all the interlocked relays are released. Hence, R5 and R6 touch and complete a circuit to junction W'L'R and thence along wire W'L' to the intermediate terminal of the transformer secondary W'. Returning to lamp 8, the other side of this lamp is connected to wire 17K which may be traced through the e plug and socket along wire 17K to contact K17, K18, wire KM3, contacts M18 and M17 and wire 17M to contacts N11 and N12, wire Jk to U1, U2, 13P to P13, P12 to ground wire Jb.

Lamp 2 may be traced along wire 4K through pe and se and wire 4K to contacts K4 and K3 to wire Jk and then to ground as above. Lamp 5 has its circuit along wire 2K through contacts K2 and K1, wire KM2 to M1 and M2 to wire Jk and thence to ground as above.

Lamp 1 has its circuit along wire 10R to contacts R10 and 11 and thence to Jk. Lamp 3 goes along wire 3M to M3 and M4 to Jk. Lamp 9 goes by way of wire 4V to V4, V3 and then to Jk. Lamp 6 is connected by wire 7Q to Q7 and 8 to Jk.

Strike, spare and pin lamps 7, 4 and 10 are connected to common wire 6R going to R6 and also connected to supply wire W'L'. The other side of each lamp may be traced as follows: The strike lamp is connected by wire 20P to P20. When a strike occurs, relay P is energized and contacts P20 and P19 will make, P19 being connected to ground wire Jb. The spare light is connected by wire 8U to U8. When a spare is made, U is energized and U8 closes against U7. U7 is connected by wire PU to P18 which is normally in contact with P19 to ground. Lamp 7 is connected by wire 5S to contact S5, thence to contact S6 to Jk and to ground as above. Lamp 4 is connected by wire 9N to contact N9 thence by contact N10 to wire Jk. Pin light 10 is connected by wire 5T to contacts T5 and T6 to wire Jk.

Now assume that a puck goes down the alley. Irrespective of where the puck goes, a frame switch impulse will be generated. Thus the last two contacts of the pin switches G'' to S'' inclusive and the two frame switches F'' and T'' are all in parallel across wires JgD and Jb (ground). Wire JgD may be traced through plug pd and socket sd to contact D6. This is normally closed against contact D7 which is connected by wire to B2 and the left terminal of the winding for relay B. The circuit continues through the relay winding to B4 and supply bus Jc. It is understood in all cases the closing of the pin switches is momentary. Relay B closes and locks itself in at B1 and B2. This circuit is as follows: contact S'2 (grounded to Jb), S'1, wire BS', B1, B2, winding of B and supply wire Jc.

The closure of relay B completes a circuit for frame motor P' as follows: supply wire Jc to B4, B3, wire T'B to T'2 and thence to P'1 through the motor and to ground P'2 and Jb. This starts frame motor P'. Cam T' turns and closes T'1 and 2 to complete a motor hold circuit from supply wire Jc directly to T'1 and 2 to the motor and thence to ground. After motor P' has started and closed T'1 and 2, cam S' momentarily breaks S'1 and 2, this being in the ground return for the winding of relay B. Hence B opens shortly after P' starts. This action always occurs irrespective of the score obtained by a puck.

When P' cycles, cam T' breaks the motor operating circuit at T'1 and 2 to stop the motor at the end of its cycle. Cam Q' momentarily closes Q'1 and 2 to energize bell ringing coil A'' only if a strike has been made, in which case relay P would be closed. This circuit may be traced from Q'1 along wire PQ' to junction PH'Q'' and thence along wire H'P to contact 15 of relay P. When relay P is closed, P15 is grounded through P14 and its connection to ground wire Jb. Returning to Q'2, wire A''Q' may be traced through socket sb to plug pb, then to socket sc to plug pc and thence along wire A''Q' to terminal A''2 of the winding and thence to supply wire Jc.

Referring now to cam R', two sets of contacts are also momentarily closed during the frame motor operating cycle. Contact R'4 is grounded. Contact R'3 is connected by wire C'R' to junction C'H'R' and thence by wire C'H' through socket sa and plug pa to a continuation of wire C'H' to one terminal of the operating winding of frame stepping switch C', the other terminal of this winding being connected to supply wire Jc.

Thus C' is stepped up once by cam R'. In case of a strike, contacts H'3 and 4 step it up again so that one frame may be stepped off on C'. This will be more fully explained later.

Contacts R'1 and 2 are also closed momentarily. Contact R'2 is connected by wire GR' to the winding of relay G, the circuit continuing through the winding of G and thence by wire GG' to contact G'1 through the normally closed contacts G'1 and 2 to wire Ja. This wire Ja may be traced through contacts A'5 and 6 on the coin control switch A' to supply wire Jc and for practical purposes during a game, wire Ja may be considered as a supply wire. Returning to contact R'1, this contact is connected by wire C'R'2 to junction CC'R'. From this junction wire C'R'2 goes to socket sa, plug pa and along wire C'R'2 to terminal 23 of frame switch C'. Referring to Figure 15 for the internal wiring of this switch, terminal 23 is connected by wire to spaced contact points 23a to 23w inclusive. These contact points are spaced two switching steps apart so that grounded wiper C'26 will alternately touch and miss a contact point in the 23 series. At the start of a game as shown, wiper 26, which had been one step in advance of C'23a, moves to contact C'23a. Hence the first puck to start the game will cause wiper 26 to step forward one step due to frame motor P' cycling once. Wiper 26 will not connect with any of the contact points in the 23 series so relay G will not be energized. However, if the first puck happened to score a strike, then relay P would have been closed. This would complete a circuit from grounded contact P16 to P17, wire 17P to wire K'E' to F'2 of the scoring motor and thence to supply wire Ja.

Either for a strike or for the second puck in a frame, a circuit for energizing scoring motor F' will be provided. In the case of the second puck, the scoring motor is energized through relay G whereas with a strike on the first puck then the scoring motor is energized through relay P.

When the scoring motor relay G is energized the circuit for energizing the scoring motor is as follows: Contacts G3 and 4 are made. G4 is grounded. G3 is connected by wire GE' to junction GK'E', connected by wire K'E' to terminal 2 of the scoring motor F'. Contacts G1 and 2 are merely for locking relay G in, this circuit going from grounded contact G1 through G2 and the G winding to wire GG' and thence through contacts G'1 and 2 to supply wire Ja. After motor F' starts, cam G' breaks the relay holding circuit for G while cam K' through contacts K'5 and 4 keeps motor F' operating for one cycle. This is due to the fact that K'E' is grounded through K'5 and 4.

Cam H' through contacts H'1 and 2 operates relay winding W to release relays K to V. This circuit may be traced from line wire W2 through the winding of relay W to H'W, through contacts H'1 and 2 and then by wire H'V' to the other line wire.

Contacts H'3 and 4 are provided to advance frame switch C' one extra step in case of a strike. Thus H'3 is connected by wire H'P to contact 15 of relay P, which contact is grounded through P14 upon the occurrence of a strike when relay P is energized. The remainder of the circuit has been traced along wire C'H' to the operating winding of frame switch C'.

If a puck strikes any one or more of the pin switches, a circuit for energizing relay B will be established as follows: from ground wire Jb at the pin switches along any one or more of the frame control switches (the contacts connected between Jb and JgD) to wire JgD back through plug pd and socket sd to D6 and D7 then by wire to the left terminal of the winding for B and thence through the winding to supply wire Jc. As pointed out, B starts P'.

When F' starts, K'1 and 2 will make. Beginning with grounded K'2, a circuit through K'1 wire K'C' to junction K'DC' along wire DC' through the winding of relay D to supply wire Jc will energize relay D. The "Game Over" light circuit between K'2 and contacts D2 and 3 to the "Game Over" light will be open at K'2. The energization of relay D is momentary and performs no useful function. K'4 and 5 merely constitute a temporary motor hold circuit to keep motor F' operating for one cycle.

The pin switches and pin relays will now be described. Assume that a puck strikes the finger for switch G'' and closes this momentarily. Contacts G''1 and 2 will do nothing since H''1 remains open. Closure of G''3 and 4 connects wires G''A and JeD. Wire G''A goes through plug pd and socket sd to junction G''AS. From this junction wire G''A goes to A5. Unless this relay is closed nothing happens. From G''AS, wire G''S goes to junction K''KS and to contact S7. From junction G''KS, wire G''K goes to contacts N8 and K7. These latter relays are presumed to be open. A circuit for closing S will therefore be established as follows: Ja (supply wire), winding of S, S8 and 7, G''S, G''AS, G''A, socket sd plug pd, through G''3 and 4 along wire JeD, through the plug and socket again, wire JeD to D1, D2, D'K' to K'3, K'2 to ground. Relay S will remain in closed position because of its mechanical construction. The only effect the relay operation will have is at contacts S3—4 and S5—6. Closure of S3—4 sets up a circuit for counting 7 on the score. This will occur upon energization of F' and will be traced out later. S5—6 will open and cut out the light for pin 7. Thus S5 is connected by wire 5S through se and pe to pin light 7. The circuit through the light may be traced along wire 6R to junction W'L'R and up to transformer winding W'. Contact S6 is connected to Jk, to U1, U2, wire 13P to P13, P12 to ground Jb.

Relays K, N and S which cover pins 2, 4, 5, 7, 8 and 9 are electrically interconnected so that if K goes on, N and S will also go on, since these two pin light controls are included in the group handled by K. Thus as an example, K5 and 6 closing complete a circuit for the winding of N-wire Jb, K6, K5, MN, MH''N, N15, N16, the winding of N to supply wire Ja. Contacts K7 and 8 close a similar circuit for the winding of S.

Similarly, relay M when operated will also cause the closure of relays Q, T and V, unless these relays have been previously closed individually. Thus to energize relay K, it will be necessary to close K'' or M''. The circuit is as follows: Ja, winding of K, K20, K19, M''K to K''1 and 2 or M''1 and 2, JdD, D4, D5, DR, R7, R8, Jb. Similarly the circuit for M is Ja, winding of M, M20, M19, Q''M, Q''1 and 2, or P''1 and 2, JdD and as above. It will be clear that if R happened to be open then neither K nor M would have been affected.

Referring now to R, this is only affected by switch N''. Thus N''R from N''1 goes to the winding of R, wire RF to the winding of F to supply wire Ja. From N''2, wire JeD runs to D1, D2 and D'K' to K'3 and 2 to ground. F and R are both energized. When R5 and 6 open, the wire to pins 6, 9, 3, 1, 5, 2 and 8 is open.

It will be noted that pin lights 4 and 7 are on. Under certain conditions, these two pin lights go out also with the actuation of the number 1 pin switch only. Thus relay F goes on with relay R. Contact F3 is grounded when it closes on F4. F3 may be traced through CF3 and C9 and 10 to the winding of A and thence to supply wire Ja. When relay A closes, the alternate scoring previously referred to comes into play. Through A1 and 2 relay T may be operated providing stepping switch D' is in proper position. Otherwise, contacts A3 and 4 close a circuit for operating relay N. This circuit may be traced from Ja through the winding of relay N to N16 and 15 along wire H"N to junction H"NA and thence along wire H"A to A3, A4, wire D'A to D'16 and then along a wiper to ground (assuming of course that D' is in proper position). Hence under some conditions the pin switch for number 1 pin will affect pins 1 to 9 inclusive and at other times will substract pins 4 and 7 from this group, this however only occurring on player 1.

The various relays K to V inclusive are so interconnected that if all pins are down with two pucks, relay U is operated. Relays U and P are so interconnected that only one of these can be operated during one frame.

The actual scoring will now be considered. When any of the pin relays are operated certain contacts in N' are energized. When the scoring motor operates and sweeps the wiper over these contacts, pulses are transmitted to the scoring relays to advance the score. Thus for example, relay T has T4 connected to N'2. When relay T closes, a pulsing circuit is established as follows: T3, wire Jm, P1, P2, 2P, U3, U4, wire EU, E8, E7 or 9 depending upon which player is operating, wire D'E or D"E to the operating coil of either D' or D" and then to supply wire Jc.

This means, therefore, that if T is the only relay operated during a frame, the wiper for N' would sweep over all dead contacts but N'2, this being alive and pulsing the scoring stepping switch once. The stepping switches themselves with their scoring lights are conventional and the lighting circuits need not be followed in detail.

If relay K is operated, relays S and V are also operated as previously pointed out. This should cause six scoring pulses. K15 is connected to N'10. K13 is connected to N'7. K11 is connected to N'4. N4 is connected to N'8. S4 is connected to N'5. V1 is connected to N'3. All these relays contacts close against contacts connected to Jm and the remainder of the circuit has been traced before. Hence six pulses will be transmitted to the scoring stepping switch. Similarly other relay combinations will work out the correct number up to 9. If relay U is operated a different scoring count results. Thus U5 is connected to wire N'U going to N'13. Contact U6 is connected to P6, then to P5, wire PE to E2. Depending upon the condition of E, the circuit continues to HE' or HE" and thus to the operating coil of either E' or E". This means, therefore, that in addition to the pulses to D' or D" due to the ten pin lights being out, there will be an additional score of 10 due to the spare.

If relay P is energized contacts P11 and P9 are connected to P6 then to P7, wire PH to H2 and then either to the operating coil of E' or E". P11 and P9 are connected to N'13 and N'12 so that the wiper for N' will pulse E' or E" twice for a score of 20 in addition to the score of ten due to the remaining pin relays being operated.

While the invention has been described in connection with a bowling alley, it is understood that it may be applied to other games. When so applied to other games, the bowling alley will then become a playing area and the pin switches will become game element switches disposed in the area. The frame-count switch may be considered as a switch for counting playing units.

What is claimed is:

1. In a game, the combination of a playing area in which movable game elements may travel, game element switches disposed in said area to be actuated by a game element, two separate complete player scoring systems including stepping switches, circuits and relays connecting said game element switches and scoring systems, a play-count stepping switch, connections between said game element switches and play-count stepping switch for stepping up the latter for a play unit, said play-count stepping switch having solo and dual play ranges respectively, manually controlled means for selecting the desired play-count switch range at the beginning of a game, additional relays, connections between said last named relays and said scoring systems for establishing operating circuits for one or other scoring system so that such scoring system will register the score made during a play unit and connections between the play-counting switch and said last named additional relays for maintaining said last named additional relays in solo position during a solo game with only one scoring system operating when a solo game has been selected by said manual means, and additional connections between the play-counting switch and said additional relays for moving said additional relays alternately from one position to another position during a dual game after each play unit so that one scoring system and then the other scoring system operates during successive play units.

2. In a game, the combination of a playing area in which movable game elements travel, game element switches disposed in said area to be actuated by a game element, two separate complete playing scoring systems including stepping switches, circuits and relays connecting said game element switches and scoring systems, a play unit count stepping switch, connections between said game element switches and play unit count stepping switch for stepping up the latter for each playing unit in a game, connections on said play unit stepping switch for defining a solo range and a dual range, manually controlled means for selecting the desired play unit stepping switch range at the beginning of a game, a solo-dual relay, connections between said solo-dual game relay and said scoring systems for establishing operating circuits for one or another scoring system in one or other position of said solo-dual game relay, manual means for selecting the solo game range on said play unit count stepping switch and for maintaining said solo-dual game relay in said one position for an entire game, manual means for selecting the dual game range on said play unit count stepping switch and connections between the play unit count stepping switch and said solo-dual relay for moving said last named relay alternately from one position to the other position and back again at the end of each playing unit so that each player has his score added at the end of his playing unit.

3. In a game, the combination of a playing area in which movable game elements travel, game element switches disposed in said area to be actuated by a game element, two complete separate player scoring systems, circuits and relays connecting said game element switches and scoring systems, a play unit counting stepping switch, connections between said game element switches and play unit stepping switch for stepping up the latter for each unit played in a game, contacts on said play unit counting switch to define an operating range corresponding to a solo game, contacts for said play unit counting switch for defining a range corresponding to a dual game, connections between said range defining contacts and said scoring systems for disabling the latter when the end of a solo or dual game range has been reached, manually controlled means for completing the range determining circuits on said play unit counting stepping switch, said manually controlled means having a solo position and dual game position respectively for completing the respective range limiting circuits on said play unit counting switch, a solo-dual game relay, connections between said last named relay and said scoring systems for establishing operating circuits for one or other scoring system depending upon whether said last named relay is in one or other position, means for maintaining said last named relay in one position when said manual control is set to a solo position, and means including connections between said last named relay and said play unit counting switch for moving said relay from one position to the other position alternately at the end of each play unit when the manual control is in the dual game position.

4. In a game, the combination of an area in which movable game elements may travel, game element switches disposed in said area to be actuated by a game element, two separate scoring systems, score storage relays controlled by said game element switches, said relays having normal and off-normal positions respectively, a locking relay interlocked with said last named relays, said last named relays having stable normal and off-normal positions and being movable by said locking relay to normal position, play unit determining relays, a motor-driven switches, connections between said play unit determining relays and said motor-driven switches for actuating the latter at the end of each play unit, means controlled by said motor-driven switches for stepping up the scoring systems in accordance with the conditions of the score-storage relays and means controlled by said motor-driven switches after said scoring operation for energizing said locking relay to clear the score-storing relays, and means controlled by said play unit determining relays for disabling the systems at the end of a game.

5. The system according to claim 4 comprising a play unit counting stepping switch, means for defining two ranges on said play unit counting switch corresponding to a solo or dual game respectively, manually controlled means for selecting the desired range, a solo-dual game relay, means for rendering one scoring system operative when said solo-dual relay is in one position, means for rendering the other scoring system operative when said solo-dual relay is in the other position, means for maintaining said solo-dual relay in said one position when said solo range is selected, and means including connections between said play unit counting switch and said solo-dual relay for alternately moving said relay from one position to the other after each play unit so that each scoring system is stepped up by an appropriate amount after each play unit when said dual game range is selected and means for returning said scoring systems to zero prior to the initiation of a game.

6. In a game, the combination of a playing area in which movable game elements travel, game element switches disposed in said area to be actuated by a game element, score-storage relays having stable normal and off-normal positions, a locking relay interlocked with said score-storage relays for returning any score-storage relay from an off-normal position to a normal position upon energization of said locking relay, connections between said game element switches and score-storage relays for establishing scoring values depending upon which game element switches have been actuated during a playing unit, a play unit counting stepping switch, connections between said play unit counting stepping switch and said game element switches for stepping up said play unit counting switch, motor driven switches, means controlled by said play unit counting stepping switch to energize the motor for driving said motor driven switches after each play unit, at least one game scoring system, said scoring system including at least one stepping switch, connections between said score-storage relays and said motor driven switches and said scoring system for stepping up said scoring stepping switch in accordance with the condition of said score-storage relays, relay means for altering certain connections between game element switches and score-storage relays so that different scoring values will be provided for certain game element switch combinations, and means controlled by said motor driven switches for energizing said locking relay after each playing unit after the scoring system has been stepped up.

7. The system according to claim 6 wherein two separate complete scoring systems are provided, means for determining solo and dual play unit ranges on said play unit counting switch, manual means for selecting the solo or dual range to be operative at the beginning of each game, a solo-dual game relay, connections between said last named relay and said scoring systems whereby in one relay position one scoring system is effective and in the other relay position the other scoring system is effective, means for maintaining said solo-dual relay in said one position during a solo game, connections between said play unit counting switch and said solo-dual game relay for moving said last named relay alternately from one position to the other at the end of each play unit during a dual game and means for disabling said systems when said play unit counting switch has reached the end of the effective range.

8. In a bowling game, the combination of an alley along which a movable game element may travel, pin switches disposed across said alley to be actuated by a game element, two separate complete player scoring systems, circuits and relays connecting said pin switches and scoring systems, a frame-count stepping switch, connections between said pin switches and frame-count stepping switch for stepping up the latter for each frame played in a game, said frame-count stepping switch having ten and twenty frame ranges respectively for solo and dual games, manually controlled means for selecting the desired frame range at the beginning of a game, additional relays, connections between said last named relays and said scoring systems for establishing operating circuits for one or other scoring system so that such scoring system will register the score made during the frame and connections between the frame-counting switch and said last named additional relays for maintaining said last named additional relays in solo position during a solo game with only one scoring system operating when a solo game has been selected by said manual means, and additional connections between the frame-counting switch and said additional relays for moving said additional relays alternately from one position to another position during a dual game after each frame so that one scoring system and then the other scoring system operates during successive frames.

9. In a bowling game, the combination of an alley along which a movable game element travels, pin switches disposed across said alley to be actuated by a game element, two separate complete playing scoring systems, circuits and relays connecting said pin switches and scoring systems, a frame-count stepping switch, connections between said pin switches and frame-count stepping switch for stepping up the latter for each frame played in a game, connections on said frame-count stepping switch for defining a ten frame range for a solo game and a twenty frame range for a dual game, manually controlled means for selecting the desired frame stepping switch range at the beginning of a game, a solo-dual relay, connections between said solo-dual relay and said scoring systems for establishing operating circuits for one or another scoring system in one or other position of said solo-dual relay, manual means for selecting the solo game range on said frame-count stepping switch and for maintaining said solo-dual relay in said one position for an entire game, manual means for selecting the dual game range on said frame-count stepping switch and connections between said frame-count stepping switch and said solo-dual relay for moving said last named relay alternately from one position to the other position at the end of each frame so that each player has his score added at the end of his frame.

10. In a bowling game or the like, the combination of an alley along which a movable game element travels, pin switches disposed across said alley to be actuated by a game element, two complete separate player scoring systems, circuits and relays connecting said pin switches and scoring systems, a frame-count stepping switch, connections between said pin switches and frame-count stepping switch for stepping up the latter for each frame played in a game, contacts on said frame-count switch to define an operating range corresponding to ten frames for a solo game, contacts for said frame-counting switch for defining a twenty frame range corresponding to a dual game, connections between said range defining contacts and said scoring systems for disabling the latter when the end of a solo or dual game range has been reached, manually controlled means for completing the range determining circuits on said frame-counting stepping switch, said manually controlled means having a solo position and dual game position respectively for completing the respective range limiting circuits on said frame-counting switch, a solo-dual relay, connections between said last named relay and said scoring systems for establishing operating circuits for one or other scoring system depending upon whether said last named relay is in one or other position, means for maintaining said last named relay in one position when said manual control is set to a solo position, and means including connections between said last named relay and said frame-counting switch for moving said relay from one position to the other position alternately at the end of each frame when the manual control is in the dual game position.

11. In an electric bowling alley, the combination of an alley along which a movable game element may travel, pin switches disposed across said alley to be actuated by a game element, two separate scoring systems, score storage relays controlled by said alley switches, said relays having normal and off-normal positions respectively, a locking relay interlocked with said last-named relays, said score storage relays having stable normal and off-normal positions and being movable by said locking relay to normal position, frame-determining relays, motor-driven switches, connections between said frame-determining relays and said motor-driven switches for actuating the latter at the end of each frame, means controlled by said motor-driven switches for actuating the scoring systems in accordance with the conditions of the score storage relays and means controlled by said motor-driven switches after said scoring operation for energizing said locking relay to clear the score storing relays, and means controlled by said frame-determining relays for disabling the systems at the end of a game.

12. The system according to claim 11 comprising a frame-counting stepping switch, means for defining a ten and twenty frame range respectively on said counting switch corresponding to a solo or dual game respectively, manually controlled means for selecting the desired range, a solo-dual relay, means for rendering one scoring system operative when said solo-dual relay is in one position, means for rendering the other scoring system operative when said solo-dual relay is in the other position, means for maintaining said solo-dual relay in said one position when said ten frame range is selected for a solo game, and means including connections between said frame-counting switch and said solo-dual relay for alternately moving said relay from one position to the other after each frame so that each scoring system is stepped up by an appropriate amount when said dual game range is selected and means for returning said scoring systems to zero prior to the initiation of a game.

13. In a bowling game, the combination of an alley along which a movable game element travels, pin switches disposed across said alley to be actuated by a game element, score storage relays having stable normal and off-normal positions, a locking relay interlocked with said score storage relays for returning any score storage relay from an off-normal position to a normal position upon energization of said locking relay, connections between said pin switches and score storage relays for establishing scoring values depending upon which pin switches have been actuated during a frame, a frame-counting stepping switch, connections between said frame-counting stepping switch and said pin switches for stepping up said frame-counting switch, motor-driven switches, means controlled by said frame-counting stepping switch to energize the motor for driving said motor driven switches after each frame, at least one bowling scoring system, said scoring system including at least one stepping switch, connections between said score storage relays and said motor driven switches and said scoring system for stepping up said scoring stepping switch in accordance with the condition of said score storage relays, relay means for altering certain connections between pin switches and score storage relays so that different scoring values will be provided for certain pin switch combinations, and means controlled by said motor driven switches for energizing said locking relay after each frame after the scoring system has been stepped up.

14. The system according to claim 13 wherein two separate complete scoring systems are provided, means for determining solo and dual game frame ranges on said frame-counting switch, manual means for selecting the solo or dual range to be operative at the beginning of each game, a solo-dual relay, connections between said last named relay and said scoring systems whereby in one relay position one scoring system is effective and in the other relay position the other scoring system is effective, means for maintaining said solo-dual relay in said one position during a solo game, connections between said frame-counting switch and said solo-dual relay for moving said last named relay alternately from one position to the other at the end of each frame during a dual game and means for disabling said systems when said frame-counting switch has reached the end of the effective range.

JERRY C. KOCI.

References Cited in the file of this patent

UNITED STATES PATENTS

| Number | Name | Date |
|---|---|---|
| 2,118,303 | Hehn | May 24, 1938 |
| 2,181,984 | Warner | Dec. 5, 1939 |
| 2,223,255 | Koci | Nov. 26, 1940 |
| 2,590,444 | Millman et al. | Mar. 25, 1952 |